US009185116B2

(12) United States Patent
Wong et al.

(10) Patent No.: US 9,185,116 B2
(45) Date of Patent: Nov. 10, 2015

(54) METHODS AND SYSTEMS FOR USE IN PROVIDING ACCESS THROUGH A SECONDARY DEVICE TO SERVICES INTENDED FOR A PRIMARY DEVICE

(75) Inventors: Ling Jun Wong, Escondido, CA (US); Charles McCoy, San Diego, CA (US); True Xiong, San Diego, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 609 days.

(21) Appl. No.: 12/980,237

(22) Filed: Dec. 28, 2010

(65) Prior Publication Data

US 2012/0117183 A1 May 10, 2012

Related U.S. Application Data

(60) Provisional application No. 61/412,321, filed on Nov. 10, 2010, provisional application No. 61/412,300, filed on Nov. 10, 2010.

(51) Int. Cl.
*H04L 29/06* (2006.01)
*H04L 29/08* (2006.01)

(52) U.S. Cl.
CPC ........ *H04L 63/104* (2013.01); *H04L 29/08792* (2013.01); *H04L 63/101* (2013.01); *H04L 65/1073* (2013.01); *H04L 65/1093* (2013.01); *H04L 65/4084* (2013.01)

(58) Field of Classification Search
USPC ......................................................... 709/217
See application file for complete search history.

(56) References Cited

U.S. PATENT DOCUMENTS

| 7,676,690 | B2 | 3/2010 | Bucher et al. | |
|---|---|---|---|---|
| 8,266,243 | B1* | 9/2012 | Carlson et al. | 709/217 |
| 2003/0103075 | A1* | 6/2003 | Rosselot | 345/717 |
| 2004/0066747 | A1* | 4/2004 | Jorgensen et al. | 370/241 |
| 2007/0162931 | A1 | 7/2007 | Mickle et al. | |
| 2007/0162932 | A1 | 7/2007 | Mickle et al. | |
| 2008/0095325 | A1 | 4/2008 | Chilton et al. | |
| 2008/0196056 | A1* | 8/2008 | Bassett et al. | 725/25 |
| 2009/0300168 | A1* | 12/2009 | Guo et al. | 709/224 |
| 2011/0055901 | A1* | 3/2011 | Karaoguz et al. | 726/4 |
| 2011/0154135 | A1* | 6/2011 | Tyhurst et al. | 714/57 |

OTHER PUBLICATIONS

Alcatel-Lucent; "Maximizing Operational Efficiency and Flexibility with a Service Portal"; Published in 2009; 16 Pages.

\* cited by examiner

*Primary Examiner* — Angela Nguyen
(74) *Attorney, Agent, or Firm* — Fitch, Even, Tabin & Flannery LLP

(57) ABSTRACT

Some embodiments provide methods of providing access to services comprise: receiving, from over a distributed network, a request from a secondary device to access an account; confirming authorization to access the account; identifying one or more primary devices registered with and corresponding to the account in response to confirming authorization to access to the account, where the one or more primary devices are multimedia playback devices; receiving, from the secondary device, a selection of a first primary device of the one or more primary devices, where the first primary device is separate and distinct from the secondary device; identifying services available to the first primary device and configured to be utilized through the first primary device; and providing access, through the secondary device, to the identified services.

20 Claims, 10 Drawing Sheets

METHODS AND SYSTEMS FOR USE IN PROVIDING ACCESS THROUGH A SECONDARY DEVICE TO SERVICES INTENDED FOR A PRIMARY DEVICE

This application claims the benefit of U.S. Provisional Application No. 61/412,321, filed Nov. 10, 2010, for McCoy et al., entitled CUSTOMER INTERACTION ON EXTERNAL DISPLAY FOR IPTV DEVICES which is incorporated in its entirety herein by reference; and this application claims the benefit of U.S. Provisional Application No. 61/412,300, filed Nov. 10, 2010, for McCoy et al., entitled CUTTING EDGE REMOTE CUSTOMER SERVICE VIA 2ND DISPLAY, which is incorporated in its entirety herein by reference.

This application is further related to U.S. patent application Ser. No. 12/844,205, filed Jul. 27, 2010, for True Xiong et al., entitled CONTROL OF IPTV USING SECOND DEVICE, which is incorporated in its entirety herein by reference.

BACKGROUND

1. Field of the Invention

The present invention relates generally to accessing services, and more specifically to accessing services from remote service providers.

2. Discussion of the Related Art

The distribution of information and content has dramatically increased. Many devices have been configured to take advantage of this increased distribution. In some instances, devices are configured to access remote sources to acquire content that can be played back through the device.

Further, the content available to these devices is often much greater than was typically available to other devices. Similarly, the content can be acquired on demand.

SUMMARY OF THE INVENTION

Several embodiments of the invention advantageously address the needs above as well as other needs through methods of providing access to services. These method comprise: receiving, from over a distributed network, a request from a secondary device to access an account; confirming authorization to access the account; identifying one or more primary devices registered with and corresponding to the account in response to confirming authorization to access to the account, where the one or more primary devices are multimedia playback devices; receiving, from the secondary device, a selection of a first primary device of the one or more primary devices, where the first primary device is separate and distinct from the secondary device; identifying services available to the first primary device and configured to be utilized through the first primary device; and providing access, through the secondary device, to the identified services.

Other embodiments provide a computer-readable storage medium storing a computer program for use with a computer simulation, the computer program adapted to cause a processor based system to execute steps comprising: receiving, from over a distributed network, a request from a secondary device to access an account; confirming authorization to access the account; identifying one or more primary devices registered with and corresponding to the account in response to confirming authorization to access to the account, where the one or more primary devices are multimedia playback devices; receiving, from the secondary device, a selection of a first primary device of the one or more primary devices, where the first primary device is separate and distinct from the secondary device; identifying services available to the first primary device and configured to be utilized through the first primary device; and providing access, through the secondary device, to the identified services.

Some embodiments provide methods for use in accessing remote services. Some of these methods comprise: accessing, from a secondary device, a remote service provider over a distributed network, where the remote service provider is configured to provide services for multiple different primary multimedia playback devices accessing the remote service provider over the distributed network; accessing, through the secondary device, an account managed at the remote service provider; detecting a selection of a first primary device that is registered with the account, where the first primary device is a multimedia playback device and is separate and distinct from the secondary device; communicating, over the distributed network from the secondary device to the remote service provider, an identifier of the first primary device; receiving, at the secondary device from the remote service provider and over the distributed network, a listing of services available that correspond to and are configured to be utilized by the selected first primary device; detecting a selection, at the secondary device, of a first service of the listing of services; communicating, over the distributed network from the secondary device to the remote service provider, a request to initiate the selected first service relative to the first primary device such that the first service is available through the secondary device; and providing access, over the distributed network and through the secondary device, to the selected first service.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
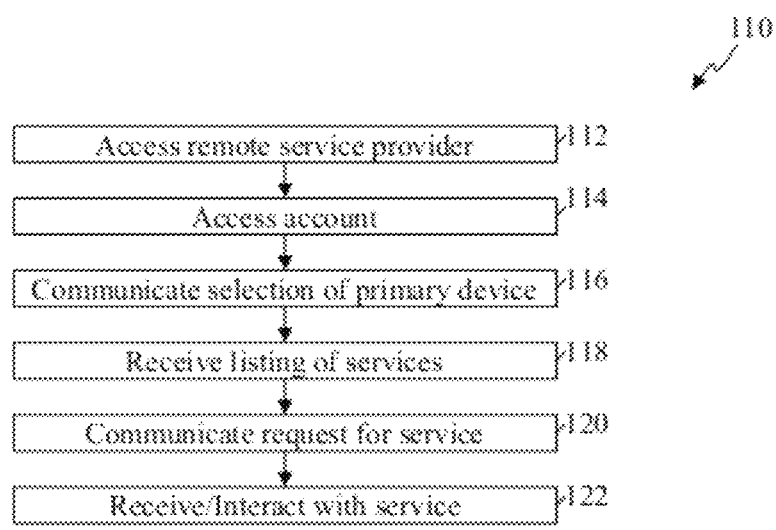
FIG. 1 depicts a simplified flow diagram of a process according to some embodiments for allowing a user to access, through a secondary device, services configured for and authorized to be used by a separate and distinct primary device.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations," or similar language means that a particular feature, structure, or characteristic described in connection with the embodiment or embodiments is included in at least one embodiment of the present invention. Thus, appearances of the phrases "in one embodiment," "in an embodiment," "in the embodiment," "in some embodiments," "in some implementation," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention Because of the ability of some primary multimedia playback devices (e.g., consumer electronic devices, such as some TVs, Blu-ray players and the like) being able to take advantage of the Internet domain, these primary devices have access to and/or possess more content than before within their systems. This distribution achievement has given rise to an equally challenging issue of content management. Because primary devices are typically shared devices that can be controlled by a simple input device, it is difficult to provide a solution that will allow content management issues without excessively raising hardware costs. It is often impractical to provide a complex remote controller because of the significant cost increases. It is also often impractical, difficult and/or impossible to navigate through services on a primary device 214 without disturbing the viewing experience of the other users. Additionally, issues of cumbersome data entry, limitations in memory and processing power, difficulties in effective content searches and the traditional, but limited, one-to-one interaction with the primary device remain as major obstacles to advantages available through these primary devices.

Many primary multimedia playback devices can be registered with a predefined remote service provider that allows the primary multimedia playback devices and/or users operating these primary devices to can take advantage of several services as a result of the primary devices being registered with the service, including accessing from the remote source listings of content from multiple sources of content, such as but not limited to sources associated with the remote service provider, separate third party services that can similarly be accessed over the distributed network to retrieve and playback multimedia content, and other such sources. For example, some Internet enabled televisions (e.g., IPTV) can access over the Internet a predefined remote service provider or source that allows the IPTV to utilize services available through the remote source that are configured for and intended for use by the IPTV, such as accessing the listing of available content from a plurality of different content source providers.

The present embodiments, however, allow a user to similarly take advantage of these services intended for use through a primary multimedia playback device, such as an IPTV, by using a secondary device that is separate and distinct from the primary device to access and utilize the available services on behalf of the primary device.

This can be very beneficial in many instances. For example, the use of the secondary device allows a user to access the available services without having to utilize the primary device to access the services, and thus, potentially interfere with the playback of content through the primary device. Similarly, one or more of the services can be accessed through the secondary device even when the primary device is not on or is experiencing some problems operating. Further, one or more of the services may be utilized in some instances when the secondary device is remote from the primary device. Additionally, the use of the secondary device can simplify or provide a user with more capabilities to interact with the remote service provider by taking advantage of the functionalities and capabilities available through the secondary device that are typically not available on a primary device, that are more cumbersome to utilize through the primary device, or cannot for some reason be accessed through the primary device (e.g., due to an error at the primary device).

In some instances, the embodiments described above and below are generally described with reference to an IPTV as the primary multimedia device. The embodiments, however, are not limited to an IPTV, and those skilled in the art will understand the embodiments can be utilized with substantially any primary multimedia playback device that is registered with a remote service provider that provides the primary device with services. Similarly, the secondary devices that can be used by a user to access the remote service provider configured to be utilized by the primary device and to interact with at least some of those services or portions of those services on behalf of the primary device can be substantially any secondary device that is capable of accessing over the distributed network the service, defining an association with the primary device and interact with one or more services available through the remote service provider and intended to be utilized through the primary device.

Furthermore, the services and/or features accessible through the secondary device are services and/or features that are typically intended to be utilized by the primary device. The secondary device can be used to access these services and/or features on behalf of the primary device. This frees up the primary device to perform multimedia playback without interfering with the playback. Further, the use of the secondary device can simplify and enhance the interaction with the remote service provider through the capabilities of the secondary device that are often not available through the primary device or not easily utilized on the primary device.

FIG. 1 depicts a simplified flow diagram of a process 110 according to some embodiments for allowing a user to access, through a secondary device, services configured for and authorized to be used by a separate and distinct primary device. In step 112, a secondary device, as controlled by a user, accesses a remote service provider over a distributed network. The remote service provider is intended to be accessed by a plurality of different primary multimedia playback devices and provide services to those primary devices that are registered with the remote service providers, such as providing listings of content that can be acquired from other remote sources and/or providing access to those remote sources, obtaining customer support, and other such services. Further, the primary devices are typically located at multiple different locations and utilize the distributed network.

In step 114, the secondary device communicates log-in instructions, typically as specified by a user, to log into an account managed by the remote service provider. One or more primary devices are similarly registered with the remote service provider and the account. A listing of these primary devices can be provided to the secondary device and displayed on the primary device or otherwise identified to the user through the secondary device. In step 116, a selection is received at the secondary device from a user selecting one or more desired primary devices on behalf of which the user is accessing services, and the secondary device communicates that selection of the primary device registered with the account to the remote service provider. In some embodiments, step 116 is skipped when there is one primary device associated with the logged in account.

In step 118, the secondary device receives a listing of one or more services available through the remote service provider and authorized for use by the selected primary device. Again, the services are configured for and intended to be utilized by the one or more primary devices, but are accessed on behalf of the selected primary device through the secondary device. In some embodiments, step 118 is skipped when there is only a single service available. In step 120, the user selects one of the services, and the secondary device communicates a request to the remote service provider to active the selected service. In step 122, the secondary device receives communication from the remote service provider and/or third party service providers allowing the user to interact with and takes advantage of the activated service through the secondary device.

Figure 2:
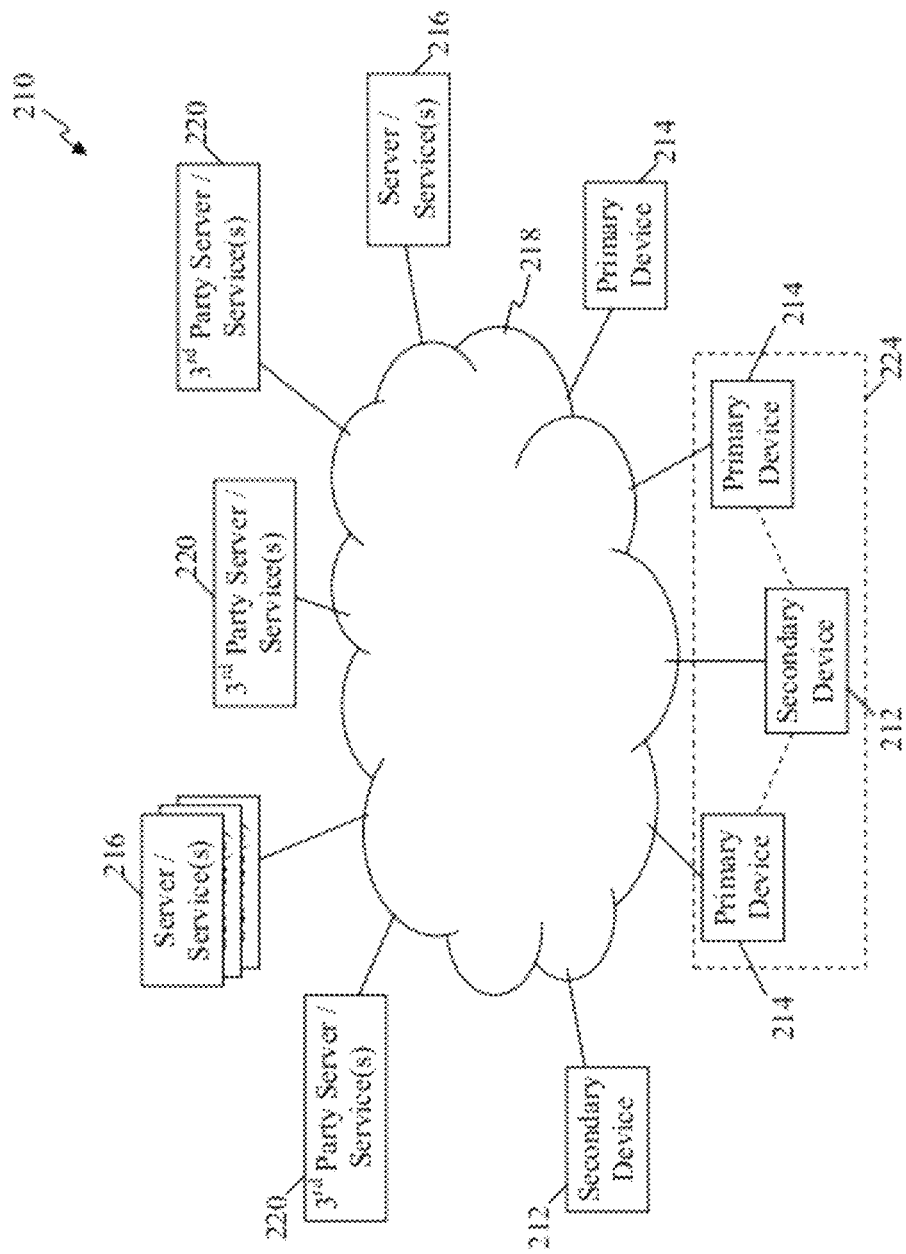
FIG. 2 depicts a simplified block diagram of a system according to some embodiments that provides a user with the capability to access one or more remote service providers.

FIG. 2 depicts a simplified block diagram of a system 210 according to some embodiments that provides a user with the capability to access one or more remote service providers. The system includes one or more secondary devices 212, one or more primary multimedia playback devices 214, one or more remote service providers 216 (and/or service provider servers), a distributed network 218, and optionally one or more third party service providers 220. The system 210 allows a user to utilize a secondary device 212 to take advantage of services available through the remote service provider 216 that are configured to be utilized by the primary devices 214. The distributed network 218 is typically the Internet or other wide area distributed network.

As introduced above, many primary devices 214 can register with and access over the distributed network 218 a remote service provider 216. This remote service provider 216 allows the primary device 214 to implement and use services that the primary device is entitled to use. For example, an IPTV can be registered with a remote service provider, such as but not limited to Sony's Essentials™ services, and be provided with the ability to identify and receive multimedia content that can be played back through the primary device 214, including providing the primary device with listings of content from one or more sources (including the Essentials™ service and third party services) and with access to selected multimedia content to be played back at the primary device. Typically, the multimedia content can be obtained from multiple sources, including sources associated with the remote service provider as well as third party services that distribute content to primary devices 214 via the distributed network 218. For example, a remote service provider (e.g., Sony's Essentials™ service) can provide an IPTV with listings of content and/or the ability to access content from sources or services that are associated with the remote service provider 216 such as but not limited to Sony Pictures Entertainment™, Sony BMG Music™ and BRAVIA Internet Video Link (BIVL) content service; and other third party content services such as but not limited to YouTube™, Yahoo!™, Amazon Video on Demand™, Netflix Service™ and other third party services. As such, content from multiple sources can be accessed through the single remote service provider 216.

Still referring to FIG. 2, the primary devices 214 can be substantially any relevant multimedia playback device that is configured to communicate over the distributed network 218, connect with the remote service provider 216 and take advantage of services provided by the remote service provider 216, such as acquiring multimedia content from over the distributed network 218 and playing back that content. For example, the primary devices 214 can be a network connected TV, a network connected Blu-ray disc player (bdp), a Dash™, a laptop, a computer, a gaming device (e.g., a Sony PlayStation®) or substantially any other relevant multimedia playback device.

The remote service provider 216 can similarly be substantially any service accessible over the distributed network 218 that allows primary devices 214 to utilize the services provided. Further, the remote service provider 216 can be implemented through one or more servers, proxy servers, databases and other such network devices, which can be at a single location or dispersed over the distributed network 218. The third party service providers 220 can similarly be implemented through one or more servers, databases and other such network devices, which can be at a single location or dispersed over the distributed network 218.

The secondary device 212 can be substantially any relevant device having the capability to connect with the remote service provider 216 over the distributed network. For example, the secondary device can be a smart phones (e.g., Sony Ericsson smart phone), computer (e.g., VAIO™ PC), laptop (e.g., VAIO™ laptop), Mylo™, notebook computer, net book computer, handheld computer, personal digital assistant (PDA), mobile phone, gaming device (e.g., Sony PlayStation®), tablet computer, handheld gaming device (e.g., PSP™), or any other relevant device, or substantially any other relevant secondary device that can access the remote service provider 216 over the distributed network 218 and take advantage of at least some of the services provided by the remote service provider 216 on behalf of a primary device 214. The secondary device typically comprises one or more processors, microprocessors, digital memory, wireless and/or wired communication modules or devices, displays, display drivers, user interfaces, communication ports and other relevant devices. Further, these devices can be implemented through hardware, software, firmware, and/or combinations thereof.

Typically, the secondary device 212 is cooperated with one or more primary devices 214 through a local area network (LAN) 224 or other such network, which can be wired, wireless or a combination thereof. The local area network 224 allows the devices within the network to locally communicate within the local area network 224. The local area network includes a connection with the distributed network 218, which in some instances can be provided through the primary device 214, a secondary device 212 or other separate router, modem or other relevant device that can allow communications between the devices of the local area network 224 and sources on the distributed network 218. In some instances, one or more of the primary devices 214 and/or secondary devices 212 are incorporated into the local area network through virtual private network (VPN) technologies, which can allow the devices of the local area network 224 to be geographically remote yet still cooperated via the local area network 224.

Additionally or alternatively, a secondary device 212 can be remote from and not part of the local area network yet still access the remote service provider 216 and take advantage of at least some of the services available from the remote service provider 216 and entitled to utilized by a selected primary device 214. For example, a secondary device 212 may be used to access and log into the remote service provider 216, select a relevant primary device 214, and view content from one or more sources that are available to be played back through the primary device 214. In some instances, a user operating the secondary device 212 can queue content to be played back by the primary device 214 once the user returns to the primary device 214 and initiates playback at the primary device 214.

Utilizing a secondary device 212 allows a user to access services that are typically limited to be used by the primary devices 214 and take advantage of at least some of the services on behalf of a primary device 214. Similarly, the services from the remote service provider 216 can be utilized without interfering with the operation of the primary device 214. For example, a user can utilize the secondary device 212 to search for multimedia content while content is being played back on the primary device 214 and without interfering with content actively being played back on the primary device 214. In some embodiments, the secondary device 212 can further communicate over the local area network 224 to the primary device 214 instructing the primary device 214 to, for example, implement playback of content selected through the secondary device 212. Additionally, in some implementations, multiple users using different secondary devices 212 can simultaneously search for available content to be played back. Again, this simultaneous searching can be conducted without interfering with the playback of content on the primary device 214, and without other users having to watch the searching or other such interactions on the primary device 214. Additionally, multiple users using secondary devices 212 can queue content to be played back on the primary device 214.

In other embodiments, the secondary device 212 can be used to access a customer support service on behalf of the primary device 214. This can be particularly beneficial in instances where the primary device 214 is not working or cannot otherwise establish a connection with the remote service provider 216. Additionally, the secondary device 212 often provides a user interface that allows for greater flexibility and/or additional functionality than the primary device 214 may provide. As such, the secondary device 212 can simplify the interaction with the remote service provider 216 (e.g., identifying and/or explaining a problem with the primary device 214 in obtaining customer support, browsing through listings of content, searching for content, and other such actions).

Figure 3:
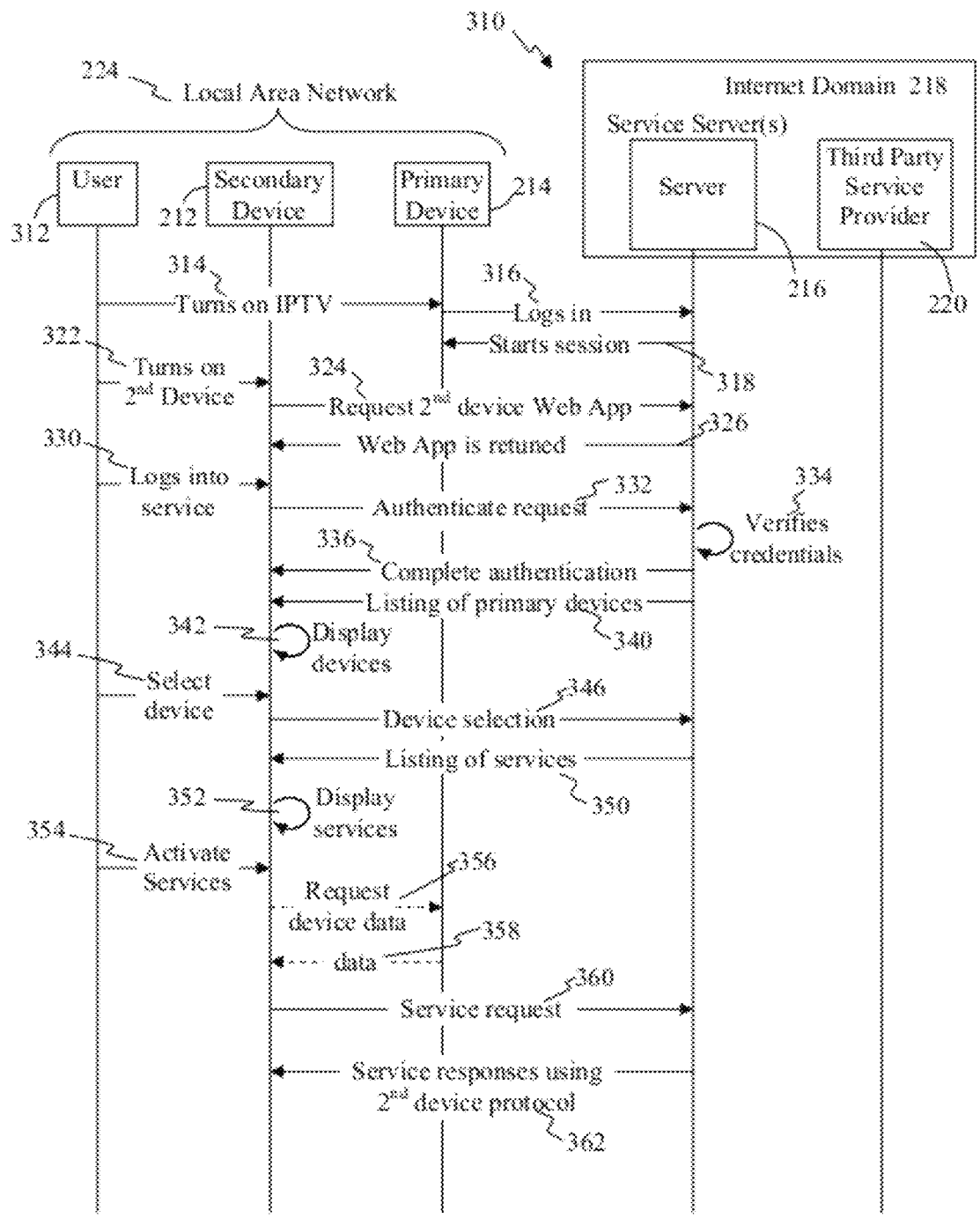
FIG. 3 depicts a simplified work flow diagram illustrating a process for use in providing services to users in accordance with some embodiments.

FIG. 3 depicts a simplified work flow diagram illustrating a process 310 for use in providing services to users in accordance with some embodiments. The process 310 show at least some of the interactions between a user 312, a secondary device 212, a primary device 214 and a remote service provider 216 accessible over a distributed network 218, such as the Internet. The operation of the primary device 214 allows a user to access a remote service provider 216 and take advantage of services available through the remote service provider 216.

In optional step 314, a user 312 activates or turns on a primary multimedia playback device 214. In optional step 316, the primary device 214 initiates contact over the distributed network 218 to the remote service provider 216. Typically, the remote service provider 216 recognizes the primary device 214 and logs the primary device into an account with which the primary device has previously been registered. In those instances where the primary device has not yet been registered, a registration process is implemented through the remote service provider 216 to establish a specific account and register the primary device with the specific account. In some instances, a user may have to provide some information and/or authentication, such as a user name, address, email address, instant messaging address, password and/or other relevant information and/or authentication. In response to the log-in the remote service provider 216 starts a session in step 318. It is noted, that the interaction of the secondary device 212 with the remote service provider 216, however, does not require a session to be active.

In step 322, a user 312 activates the secondary device 212 to contact the remote service provider 216. In some instances, the user initiates through the secondary device 212 a request in step 324 for an application to allow the secondary device to interact with the remote service provider 216 when the secondary device 212 does not already have the application. Typically, the request for the application is directed to the remote service provider 216. In other instances, however, the application may be acquired from another source, which in some instances is affiliated with the remote service provider 216. The application can be implemented through and/or activate codes, scripts and/or functionality to make appropriate network calls, dynamically display content and/or results, and allow the user to access the content or results (e.g., displayed content, browse the content and make selections). For example, the application can be a web application that utilizes HTML and implements Java programming.

In step 326 the application is returned to the secondary device 212. In some embodiments, the application is stored at the secondary device 212 for subsequent use. In other instances, however, the application may be an application accessed from the remote service provider 216 through a web browser on the secondary device 212, and is temporarily stored on the secondary device 212 while the secondary device is interacting with the remote service provider 216 through the browser.

In step 330, the user logs into the remote service provider 216 utilizing the application. As described above, the log-in typically further establishes a log-in to and/or an association with a specific previously established account. In step 332, the secondary device 212 communicates the log-in information to the remote service provider 216. The remote service provider in turn verifies the log-in and any credentials in step 334. The remote service provider 216, in step 336, confirms the authentication and log-in of the user. Accompanying this authentication or as a subsequent communication, the remote service provider 216, in step 340, further identifies or provides the secondary device 212 a listing of primary devices that are registered with the remote service provider 216 and the specific account. This listing of devices can further utilize a user's preferred language (e.g., language that the user previously selected to be utilized with the primary device 214 and/or fonts or characters of the selected language). In step 342, the secondary device 212 displays the available primary devices or otherwise identifies the primary devices to the user. In step 344, the secondary device 212 receives a selection from the user 312 of one of the available primary devices 214 registered with and corresponding to the specific account.

In step 346, an identification of the selected device is communicated from the secondary device 212 to the remote service provider 216. In reply, the remote service provider 216, in step 350, identifies services that the selected primary device 214 is entitled to utilize and typically configured for use by the primary device 214, and communicates to the secondary device 212 options or a listing of services that are available for the selected primary device 214. In step 352, the secondary device 212 displays the options or listings of services that the primary device 214 is entitled to utilize, but made available to the secondary device 212 to allow the secondary device to implement at least part of one or more of these services on behalf of the primary device 214, which again may be displayed in the user's preferred language. These options and/or services can be substantially any service or option that can be implemented through the secondary device 212 for the benefit of the primary device 214, such as but not limited to, listings of content from one or more sources, listing of queued content, options to perform transaction (e.g., on-demand content playback, video rentals, shopping purchases, travel reservations, data searching and other such transactions), listings of transaction histories (e.g., with the remote service provider 216, one or more third party service providers 220 and/or other devices or services (including purchases), and other such options), customer support service, and other services available through the secondary device 212. In some embodiments, services may be provided that allow a user to switch playback of content between different primary devices 214 and resume playback on the different primary device. For example, a user can select a different primary device and then browse recently viewed listing of content and select the content currently being played back after switching control to the different selected primary device 214.

In step 354, the user browses through the available services identified through the secondary device 212 (e.g., displayed listing), and the secondary device 212 receives a selection of an available service from the user 312 using the interface of the secondary device 212. In some embodiments, the secondary device 212 may optionally communicate with the primary device 214 to request information in step 356, for example, to more effectively utilize the selected service, apply restrictions to the service as defined through the primary device 214 and/or other such relevant information. In response to step 358, the primary device 214 may optionally return information corresponding to the request. This information may include parameter information, preferences or other relevant information. It is noted, however, that in many embodiments, no communication is needed between the secondary device 212 and the primary device 214 to interact with the remote service provider 216 or third party service providers 220, and/or to utilize at least portions of the one or more services because the remote service provider 216 often already has relevant information for the primary device 214 obtained when the primary device was registered with the remote service provider 216 and/or accumulated over time, which could include parameters, preferences, restrictions and/or other such information. As such, in many embodiments, no communication in needed between the secondary device 212 and the primary device 214 to activate and/or utilize one or more services, or provide the services to the secondary device 212.

In step 360, the secondary device 212 communicates, over the distributed network to the remote service provider 216, an identification of the selected service and in some instances additional information relevant to the requested service. In step 362, the remote service provider 216 responds with access to the requested service and allows the user 312 to utilize at least part of the services available to the selected service through the secondary device 212. The available services may include interactions with one or more third party service providers 220, may include some communication between the secondary device 212 and the primary device 214 (e.g., activating playback of content on the primary device 214), communications between the remote service provider 216 and the primary device 214 (e.g., implementing some customer support, updates, upgrades or the like), and/or additional interactions between the user 312, through the secondary device 212, and the remote service provider 216 and/or a third party service providers 220 providing third party services in cooperation with the remote service provider 216.

Figure 4:
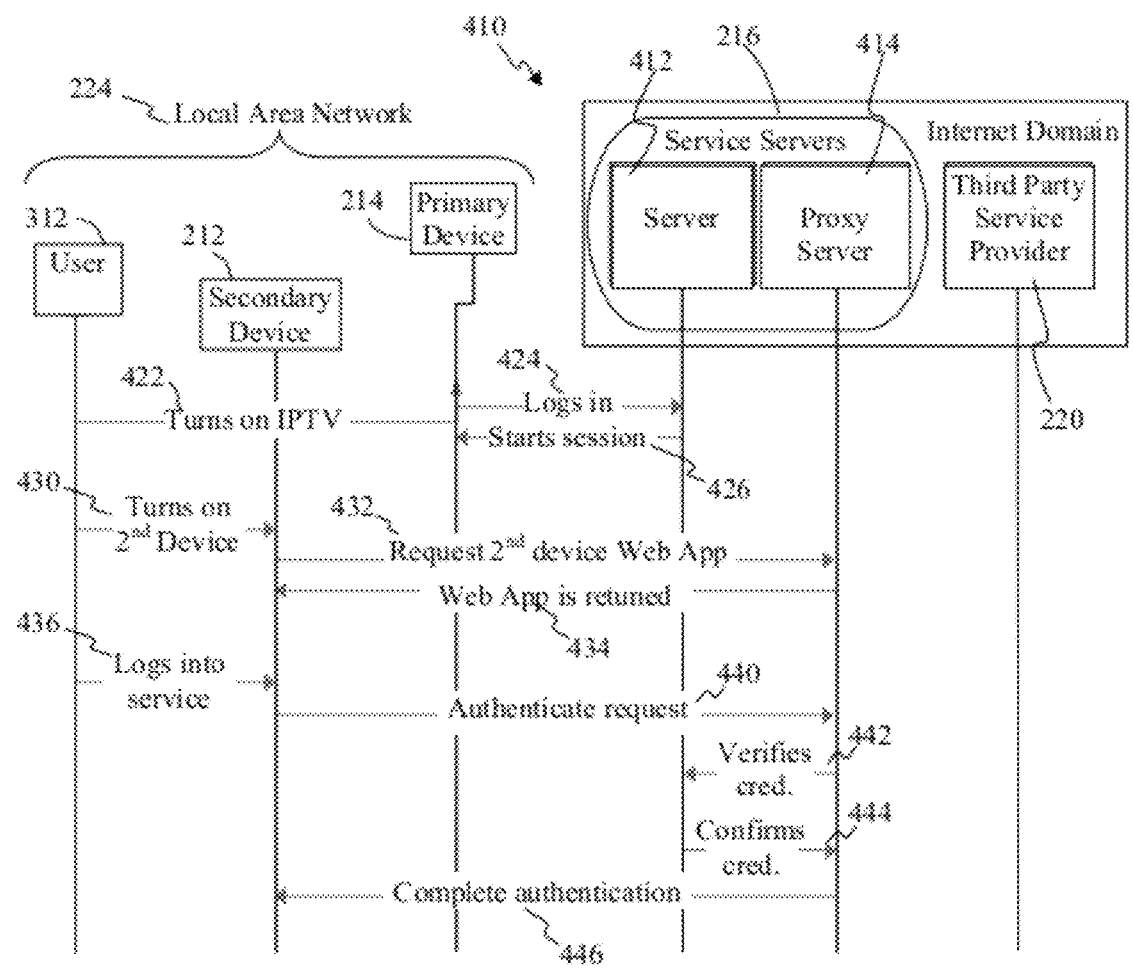
FIG. 4 shows a simplified work flow diagram, in accordance with some embodiments, illustrating a process for use in providing services to a user, including a secondary device establishing an authenticated connection with a remote service provider.

FIG. 4 shows a simplified work flow diagram, in accordance with some embodiments, illustrating a process 410 for use in allowing a secondary device 212 to establish an authenticated connection with a remote service provider 216. For example, the process 410 may in part be used to implement some or all of steps 324, 326, 330, 332, 334 and 336 of the process 310 of FIG. 3. In some embodiments, the remote service provider 216 includes a standard or main server 412 and a proxy server 414. In typically operation, the primary device 214 communicates with the remote service provider 216 through the main server 412, which can be implemented through one or more servers or other relevant devices in accessing and utilizing the services available to the primary device 214. For example, in response to the user activating, in step 422, the primary device 214, the primary device initiates, in step 424, a log-in with the main server 412. The log in can include the primary device 214 providing identifying information that the main server 412 can confirm and correlate to a specific account, such as a specific user account. In other instances, where the primary device has not yet been registered with the remote service provider 216, the user may access a previously established account and register the primary device 214 with the previously established account, or an account registration is initiated by the remote service provider 216 to create a specific account and register the primary device with the specific account. Again, the specific account may be specific to an individual user, a household, grouping of primary devices or other such specific accounts. In response to logging in, the remote service provider 216 starts a session, in step 426, with the primary device.

The secondary device 212, in some implementations, communicates with a proxy server 414 of the remote service provider 216. For example, in step 430, a user 312 can activate the secondary device 212 to access the remote service provider 216. In step 432, the secondary device 212 initiates communication with the remote service provider 216 to request the web application when the secondary device 212 does not already have the application. The communication with the remote service provider 216 is directed to the proxy server 414 for at least some communications. The proxy server 414, in part, provides protection for some communications and information that are distributed to the secondary device 212, and in some instances establishes a firewall between the relatively open secondary device 212 and the services, including the services provided by the remote service provider 216 and the third party service providers 220.

Similarly, other sensitive, protected and/or proprietary information (e.g., links to content, keys, tokens, passwords, codes and the like) can be removed from communications to the secondary device 212. Additionally or alternatively, binary applications can be utilizes that provide some security. In some instances, the proxy server 414 may incorporate additional or alternative information. As described further below, for example, the proxy server may incorporate and/or replace some of the information removed from a listing of content that is intended to be delivered to the primary device 214 with content identifiers so that the content can later be identified and correlated with the information removed. In other instances, the identifier is returned to the secondary device 212 in response to a selection of content.

In step 434, the remote service provider 216 returns the web application and/or acknowledges the connection with an activated web application at the secondary device 212. In some implementations, the primary device 214 does not have to be active to allow the secondary device 212 to utilize the web application and/or to interact with the remote service provider 216 to allow the user to take advantage of those services that a selected primary device is entitled to utilize and are available through the secondary device 212. Similarly, a session does not have to be active between a primary device 214 and the remote service provider 216 for the secondary device 212 to provide a user 312 with access to those services available through the remote service provider.

Utilizing the web application and the secondary device 212, a user can initiate, in step 436, a log-in with the remote service provider 216. In some instances, this log-in is achieved when the remote service provider 216 identifies the requesting device. For example, the remote service provider 216 may identify the user based on an identification of the secondary device 212. In other instances, however, a user provides a password, other identification and/or authentication information to confirm the accuracy of the user and the user's authorization to access the remote service provider 216 on behalf of the registered primary device 214 and a corresponding account. The secondary device 212 communicates an authentication request in step 440 to the proxy server 414. This can include providing credentials, such as a password, account identifier, user information, secondary device information and/or other such information. In step 442, the proxy server 414 requests verification of credentials from the main server 412. In step 444 the main server 412 sends a confirmation to the proxy server 414 in response to the main server 412 confirming the credentials. In response to the confirmation from the main server 412, the proxy server 414 in step 446 sends the secondary device 212 a confirmation that the user is logged in to the corresponding specific account.

Figure 5:
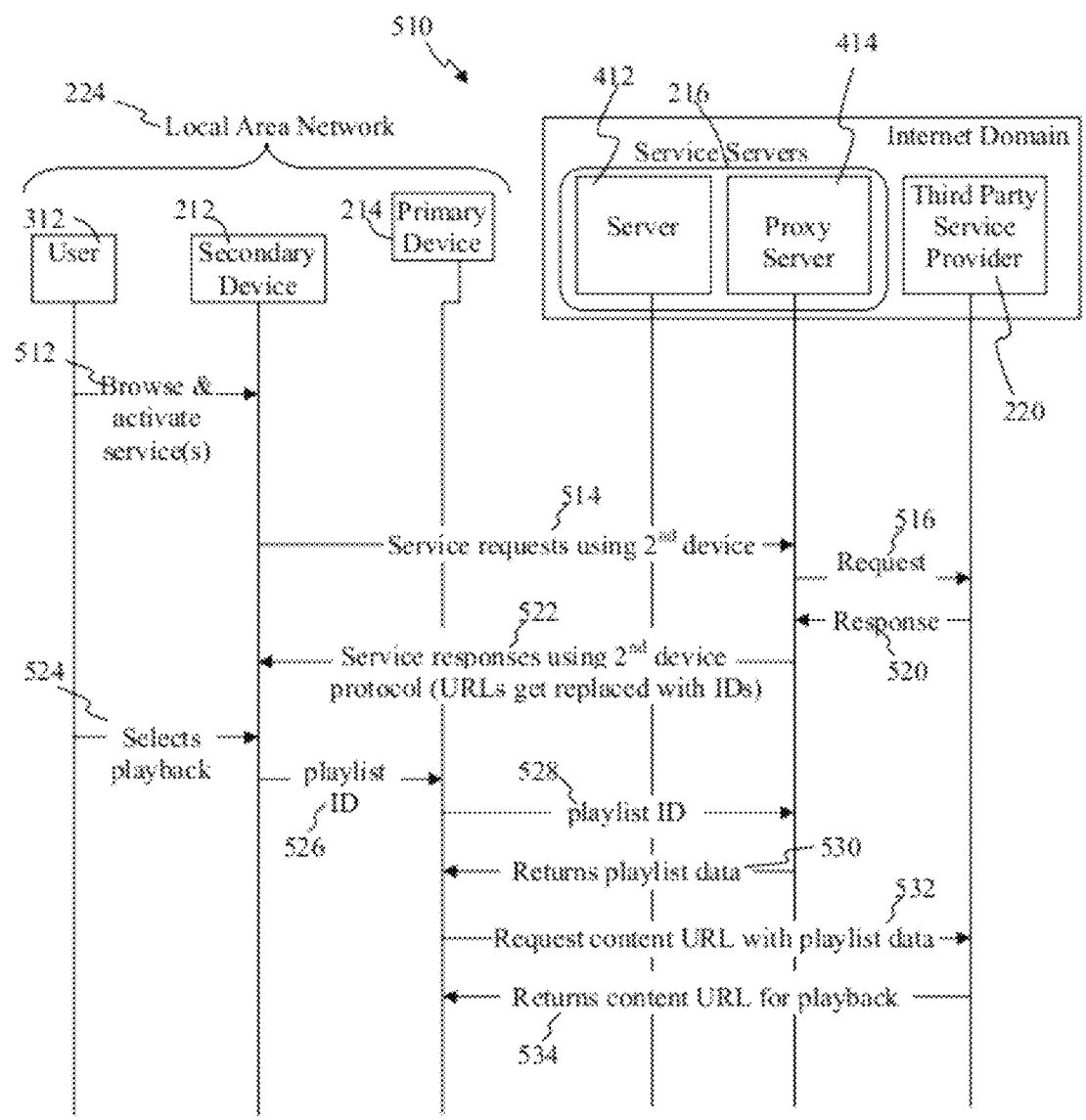
FIG. 5 shows a simplified work flow diagram, in accordance with some embodiments, illustrating a process for use in allowing a user to implement services from a remote service provider at a secondary device.

FIG. 5 shows a simplified work flow diagram, in accordance with some embodiments, illustrating a process 510 for use in allowing a user 312 to implement services from a remote service provider 216. In some embodiments, the process 510 may in part be used to implement some or all of steps 354, 360 and 362 of the process 310 of FIG. 3. Further, the process 510 is described below with reference to a service, as an example, of allowing a user to select multimedia content and initiate playback of that selected content on the primary device 214. In step 512, a user 312 reviews and/or browses, via the secondary device 212, through the listings of services and/or options provided by the remote service provider 216 and entitled to be utilized by the previously selected primary device 214 (e.g., selected in step 344), and the secondary device 212 receives a selection of a service (e.g., through the user interface of the secondary device). Again, these services can be substantially any service that can be utilized through the primary device 214, such as content listings (e.g., BIVL interaction services, Netflix services and/or other such listing services), transaction services, customer support services, and/or other such services.

In response to a selection of a service in step 512, the secondary device 212 initiates a communication, in step 514, to the proxy server 414 identifying the selected service. For example, the communication in step 514 can be a request for a listing of content that is available and entitled to be played back by the primary device 214. In step 516, the proxy server 414 identifies one or more sources of content and issues one or more requests to the identified sources, which in some instances can include requests to one or more third party service providers 220 (e.g., a content listing service), source of content at the remote service provider 216 and/or other sources of content. In step 520, sources of content, including one or more the third party service providers and/or sources 220, identify relevant content and return one or more listings of available content. In many embodiments, these listings of available content are substantially identical to listings that would have been provided had a request for available content been received from the selected primary device 214.

In some embodiments, the request from the proxy server 414 in step 516 may further identify the previously selected primary device and/or include an identifier that can be used by the third party service provider 220 in limiting the listing of content to relevant content that the previously selected primary device 214 is entitled to playback. In other instances, the third party service provider 220 returns a listing of content that the proxy server 414 can parse and identify which content is relevant to the previously selected primary device 214. Alternatively or additionally, in some implementations the third party service provider 220 may periodically supply the remote service provider 216 with a listing of content and/or provide updates when relevant. As such, steps 516 and 520 may be skipped at least for those third party service providers 220 that provide this information to the remote service provider 216, and instead, the proxy server 414 can identify the content that the selected primary device 214 is entitled to playback.

In step 522, the proxy server 414 then returns a response to the request with appropriate information to address the request. For example, the proxy server 414 evaluates the listings of available content and generates a compiled listing appropriate for the selected primary device 214 and configured for use by the secondary device 212. In some instances, the complied listing may apply restrictions to available content, such as restrictions defined by the primary device (e.g., restricting content to content with a "PG" or "G" rating). In some embodiments, the compiled listing is an altered listing of a listing that would otherwise be sent to the primary device 214 in response to a similar request directly from the primary device 214. This altered listing can, for example, provide some security relative to the listed content.

In many instances, the primary device 214 establishes a relatively secure relationship with the remote service provider 216. This secure relationship can be achieved in part by confirmed communications between the remote service provider 216 and the primary device 214, and typically is based in part on the registration of the primary device 214 with the remote service provider 216. The secure relationship, in many instances, provides assurances from the primary device 214 to the remote service provider 216 that the primary device 214 will only use supplied content in accordance with defined usage restrictions (e.g., will only playback the content and will not allow the content to be recorded). As a result, a listing of content to the primary device 214 from the remote service provider 216 may include identifiers and/or links to allow the primary device 214 to directly access and initiate playback of selected content (e.g., a URL to the content provided by a third party service provider 220).

In those instances, however, where a secondary device 212 is being used on behalf of the primary device 214 and/or the secondary device 212 has not similarly established the secure relationship with the remote service provider 216, the remote service provider 216 (e.g., through the proxy server 414) typically parses and/or filters the listing to alter the listing of content to at least remove some information. Information that might be removed can include information such as, but not limited to, information that may compromise the security and/or accessibility of the content. For example, direct links and/or URLs to the identified content can be removed in the altered listing so that the content is not made available to unauthorized devices and/or access to the content cannot be misappropriated and distributed without the remote service provider's and/or third party service provider's authorization. In some instances, the proxy server 414 may additionally add information, such as distinct content identifiers. These identifiers can be used by the secondary device 212 and/or the primary device 214 in requesting a specific content.

Still referring to FIG. 5, in step 524 a user can use the secondary device 212 to review, search, browse and/or otherwise select a desired content to be played back on the primary device 214. As introduced above, in some instances the selection of the content can be a selection to cause the primary device 214 to initiate playback of the selected content. In response to the selection, in some embodiments, the secondary device 212 extracts a content identification (e.g., a playlist identification) of the requested content and, in step 526 communicates that requested identification within the local area network 224 (e.g., a network call) or over a direct connection (e.g., via Bluetooth) to the primary device 214. The communication within the local area network 224 allows the secondary device 212 to take advantage of connections already established within the local area network 224. In other embodiments, secondary device 212 communications the selection to the proxy server 414, the proxy server 414 receives the selection and determines the content ID (e.g., via a database or communication with the third party service provider 220) and returns the content ID to the secondary device 212, which can then communicate the ID to the primary device 214.

In step 528, the primary device 214 can then extract the content identification and communicate that content identification to the remote service provider 216, and in some instances to the proxy server 414. In step 530, the remote service provider 216 (e.g., the proxy server 414) can use the content identification to identify the requested content, search the initial listing of content received from the sources of content, retrieve relevant content information for the identified content, which typically includes the content access information (e.g., a URL to the content source), and return the content information (e.g., complete playlist information) to the primary device 214. With this information, the primary device 214, in step 532, can access the relevant content source (e.g., the third party service provider 220) to request the content be delivered over the distributed network 218. For example, the primary device 214 can use the URL to access the content. In step 534, the third party service provider 220 or other relevant source then forwards the requested content to the primary device 214 such that the content is played back at the primary device 214.

Again, the above example was described in reference to a service from the remote service provider 216 that allows access from the secondary device 212 to listings of content that can be played back by the primary device 214, and initiating through the secondary device 212 playback of the content on the primary device 214. In other embodiments, the selection in step 526 can be a selection directed to the primary device 214 to have the primary device queue the request until a current content and other content earlier in the queue are played back.

In yet other instances, the selection of content in step 526 may be directed to the proxy server 414 that in turn relays that request to the third party service provider 220 to add, delete or otherwise alter a queued listing or other listing of desired content at the third party service provider 220. In these instances, for example, a secondary device 212 can interact with the remote service provider 216 without being part of the local area network 224.

Additionally or alternatively, when attempting to initiate actions at the primary device 214, through the secondary device 212, the secondary device 212 is typically part of the local area network 224. As such, the secondary device has the appropriate local area network address for the primary device 214 and can initiate the actions at the primary device 214 by communicating with the primary device via the local area network 224. In some instances, the primary device 214 can provide the remote service provider 216 with network addressing information (e.g., local area network address and/or Internet protocol (IP) address). For example, when a primary device 214 establishes a session with the remote service provider 216 or logs into the service, the primary device 214 can supply local area network addressing information. The remote service provider 216 can similarly supply this addressing information (e.g., a local area IP address that primary device 214 was last using) to the secondary device 212 for use by the secondary device in communicating with the primary device 214.

In other implementations, the primary device 214 (e.g., an IPTV) can initiate polling of the remote service provider 216 to determine whether there are instructions from the secondary device 212 and/or the remote service provider 216. Similarly, an extensible messaging and presences protocol (XMPP) connection can be established so that the primary device 214 can receive notifications through the XMPP and/or the polling connections. This can allow the secondary device 212 to communicate with the remote service provider 216, including while operating from any location and/or does not have to be part of the local area network 224. Instructions from the secondary device 212 to the primary device 214 can be received at the primary device 214 as a result of the polling and/or XMPP connection.

As described above, the services from the remote service provider 216 and/or third party service providers 220 that can at least in part be accessed and utilized through the secondary device 212 are not limited to the reviewing and selection of content. Other services that a selected primary device 214 is entitled to access can also be utilized through the secondary device 212. For example, in some implementations, a customer support service can be accessed using the secondary device 212 on behalf of the primary device 214. Additionally, in some instances, the secondary device 212 can access the customer support service even when the selected primary device 214 is experience an error, cannot connect with the distributed network 218, cannot be activated or will not correctly boot-up, or other such problems are occurring.

Additionally, the use of the secondary device 212 with some services allows a user 312 to take advantage of the additional and/or alternate functionality available with the secondary device. For example, when using a wireless smart phone as the secondary device and the user 312 accesses a customer support service from the remote service provider 216, the user 312 can take advantage of the user interface of the smart phone. Typically, the user interface of the smart phone allows greater flexibility in entering information than some primary devices 214, such as but not limited to text entry in explaining a problem. Similarly, a user interface of a secondary device 212 may allow a user 312 to more easily enter search terms and/or scroll through information provided from the remote service provider 216 and/or a third party service provider 220 than is otherwise available through a primary device 214.

Figure 6:
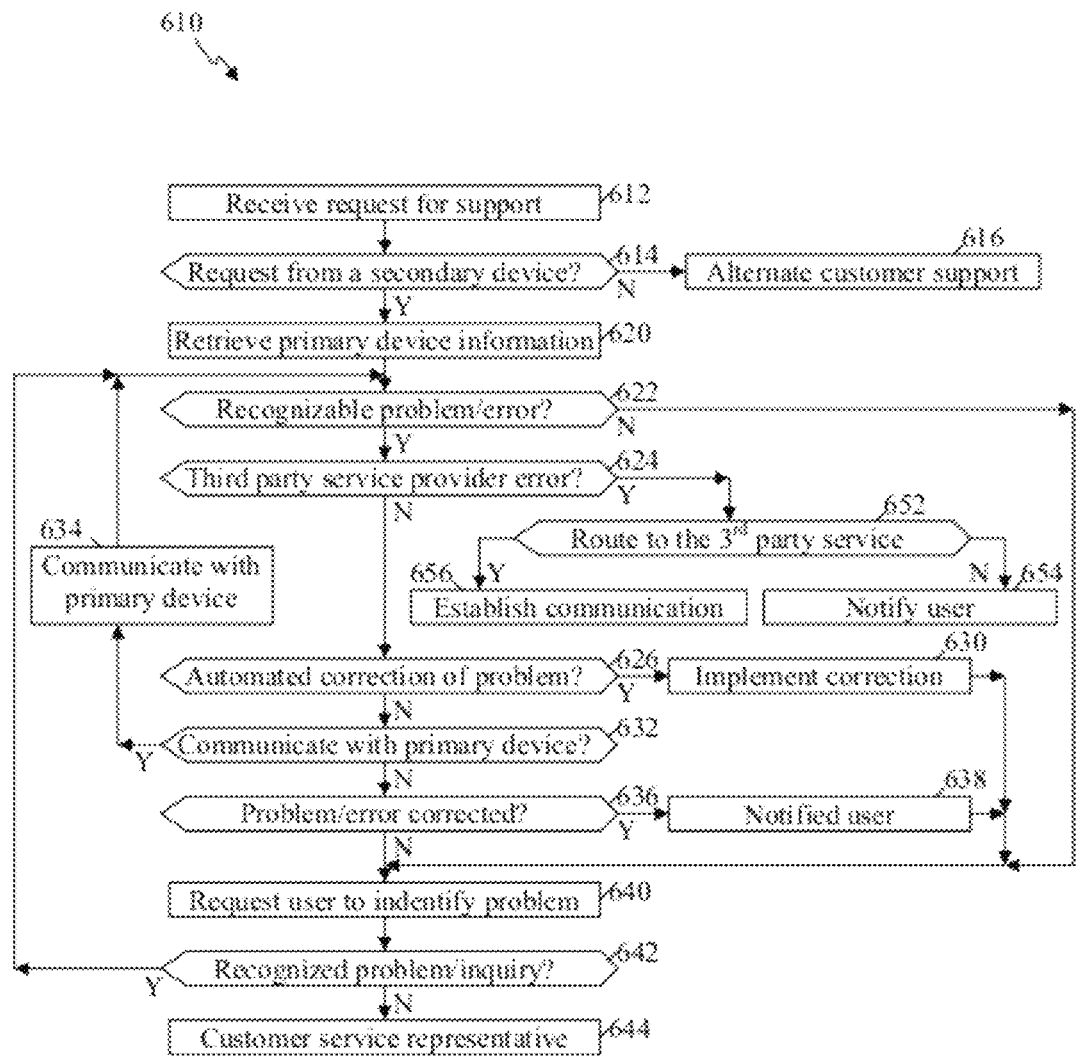
FIG. 6 depicts a simplified flow diagram of a process according to some embodiments for providing a user with access through the secondary device to a customer support service provided by the remote service provider.

FIG. 6 depicts a simplified flow diagram of a process 610 according to some embodiments for providing a user 312 with access through the secondary device 212 to a customer support service provided by the remote service provider 216 (or other service associated with or contracted with the remote service provider). In step 612, the remote service provider 216 receives a request for customer support. For example, step 612 can be similar to step 360 where a service request is received at the remote service provider 216 that requests customer support. In step 614, the remote service provider 216 determines whether the request is from a secondary device. Again, in many embodiments, the remote service provider 216 is configured to receive requests from primary devices 214. In those instances where the request is not from a secondary device 212 the process 610 continues to step 616 to implement an alternate customer support process, such as a process that would be implemented when a user 312 is accessing customer support services through a primary device 214.

When the request for customer service is received from a secondary device 212, the process continues to step 620 where the remote service provider 216 retrieves device information, transaction information and/or history information corresponding to the previously selected primary device 214. As described above, the user 312 typically selects a primary device (e.g., in steps 344, 346) for which the services are to be requested. Additionally, because the previously identified primary device 214 is also registered with the remote service provider 216, the remote service provider in many embodiments already stores and/or has access to information about the primary device 214 as a result of the registration of the primary device and/or communications between the primary device 214 and the remote service provider 216 (e.g., device type, model, Media Access Control (MAC) address, current operating system, current versions of some or all software implemented by the primary device 214, and/or other such relevant information). Further, this provides more accurate and holistic information about the primary device 214, and often includes information that a user cannot provide (e.g., log information, last time the primary device 214 accessed the remote service provider 216 and other operating parameters and information). For simplicity, this information is referred to below generally as history information; however, those skilled in the art will appreciate that the information is not limited to past or old information, but can be current information and/or information retrieved in response to one or more requests.

Additionally, in some instances, the remote service provider 216 may initiate a request to the identified primary device 214 requesting information that may be useful in providing the customer support. Again, the history information can include substantially any relevant information relevant to the primary device 214, secondary device 212, and/or about actions taken by a user 312 through the primary device 214 or secondary device 212, actions take by the primary device 214 or secondary device 212, transactions performed through the primary device 214 or secondary device 212, logs generated by the primary device 214, transaction information provided by one or more third party service providers 220 that interacted with the primary device 214 or secondary device 212, or other such relevant information and/or combinations of such information.

In step 622, the remote service provider 216 performs an evaluation of the history information to determine whether a current, detectable and/or recognizable problem or error exists. This can be based on an error code received, evaluations of log files or other such determinations. When no detectable and/or recognizable problem is detected relative to the primary device 214 the process 610 advances to step 640 to request input from the user 312 through the secondary device 212. In some embodiments, when a problem is detected the process 610 continues to step 624 to determine whether the detected problem is a problem or error with a third party service provider 220.

When the detected problem is determined to be a problem resulting from interaction with a third party (e.g., a third party service provider 220), step 652 is entered where the remote service provider 216 determines whether to route the secondary device 212 to the third party service provider 220 (e.g., the remote service provider 216 determines whether a connection can be established between the secondary device 212 and a customer support of the identified third party service provider 220). This would allow the user 312, through the secondary device 212, to obtain support from the third party service provider 220. In some instances, the connection to the third party service provider is transparent to the user 312 (e.g., the remote service provider 216 may act as a relay between the secondary device 212 and the third party service provider 220), while in other instances the remote service provider 216 notifies the secondary device 212 that a connection is being establish with the third party service provider 220.

When it is determined that a connection cannot be established with the third party service provider 220, the process 610 advances to step 654 to notify the user 312 that the detected problem is a problem with third party service provider 220. In some instances, the notification may further provide information, when relevant and appropriate, to the user 312 that might be useful to the third party service provider 220. For example, when content is not proprietary and can be beneficially used by the third party service provider 220 the information may be supplied to the user 312. Alternatively or additionally, information that may be useful to third party service provider 220 may be provided directly from the remote service provider 216 to the third party service provider 220 when relevant and appropriate, so that when the user contacts the third party service provider 220 the information is readily available to the third party service provider and can simplify the resolution of the problem. In some instances, the notification may further provide the user 312 with contact information for the third party service provider 220 when known, such as a link to the customer support for the third party service provider 220, a phone number (which may be used by some secondary devices 212 to initiate a phone call, for example, by selecting the phone number displayed on the secondary device), or other such content information.

When it is determined in step 652 that such a connection can be established the process 610 advance to step 656 to establish a communication link between the secondary device 212 and the third party service provider 220. As described above, in some instances the secondary device 212 and user 312 are optionally notified of the connection and/or routing and can additionally provide information about why the connection is being established. Additionally, information relative to the problem that may help the third party service provider 220 in resolving the problem or error may additionally be communicated to the third party service provider.

When it is determined in step 624 that the detected problem is not related to a third party service provider 220 or other third party problem or error, the process 610 advances to step 626 to determine whether the current and/or active problem or error can be addressed through updates, a reset, a change to setting, or other such action. Typically, such corrections are automated corrections initiated by the remote service provider 216 (e.g., through the use of one or more bots). In some instances, however, user interaction may be needed to implement and/or complete the correction. As such, when a perceived correction to the problem is identified, step 630 is entered where corrective action is taken to correct the problem. The user 312 is typically notified of the correction. Additionally, in some instances authorization and/or other information is obtained from the user 312 before the correction is initiated. For example, a correction may be provided if the user 312 upgrades her/his membership, and as such a notification of the correction can be provided and the correction implemented upon detection of the upgrade. In other instances, a user may not want the correction to be performed (e.g., when such corrections may alter settings that the user prefers, the primary device 214 would have to be powered down, or other such factors or situations). Upon completing the correction and/or confirming that the problem is corrected the process 610 terminates. In some embodiments, the process 610 may advance to step 640 to determine whether the user has further questions, problems or issued that may be addressed through customer support.

In those instances where the problem cannot readily be corrected in step 626, the process 610 continues to step 632 to determine whether further communications with the primary device 214 would be beneficial in evaluating the problem. For example, a customer support application at the remote service provider 216 may automatically initiate actions at the primary device 214 to see what results are obtained in diagnosing the problem. Additionally or alternatively, the primary device 214 may in some embodiments store or cache a predefined amount of information corresponding to a certain number of previous actions taken by the primary device 214 and/or actions taken over a certain amount of time. As such, the customer support application at the remote service provider 216 can request this cached information from the primary device 214. In other instances, the customer support application may request a current status, which may define one or more states, parameters, conditions, screen shot or status picture at the primary device 214, identify content being played back, identify a position within content being played back, a position within a menu, an action attempting to be performed or attempted that causes an error and/or other such information. This information may allow, in some applications, a customer support application to effectively recreate or render the conditions at the primary device 214, which can be used by the customer support application and/or a customer support representative to evaluate and identify potential problems.

When communication with the primary device might be beneficial, the process 610 continues to step 634 where the remote service provider 216 initiates one or more communications to the primary device 214 and receives one or more responses in attempts to obtain additional information that can be used in diagnosing the problem. It is noted that step 634 typically is implemented when the primary device 214 is active and can provide a response. The process 610 then returns to step 622 to further evaluate the information and problem.

In step 636, the remote service provider 216 determines whether the problem has been addressed and/or corrected. When the problem has been corrected, step 638 is entered where the user 312 is notified (e.g., identifying the problem and providing information on the corrective action taken). In some instances, the process 610 advances to step 640 to allow the user to submit further inquiries. In other instances, the process 610 terminates.

In step 640, an interface is activated and/or instructions are communicated to the user 312 through the secondary device 212 requesting the user 312 to identify a problem, submit a question or request other types of support. In some embodiments, the instructions can be displayed through a displayed user interface that has a plurality of options from which the user 312 can select, a text entry field where the user 312 can enter a string of text identifying the problem or submitting a question, the instruction may request that the user 312 verbally express a question or request, or other such instructions or combinations of such instructions. For example, a displayed user interface can include a series of options, with each option being associated with a problem or a category of problems (e.g., system will not start, cannot access content listings, problems with the playback, problems with the display, changing settings, and/or other such options). In some instances, the selection of a category causes one or more additional options to be displayed that can identify specific issues or further sub-categories. These options, in some implementations, can be based on common problems that other user's have experienced and/or expected problems. Through the secondary device 212 a user can focus down generally to a category of problems, a type of problem or in some instances a specific problem or issue being experienced relative to the primary device 214.

Additionally or alternatively, the displayed user interface may have a text entry field that allows a user to enter a query, state a problem or otherwise initiate communication with the remote service provider 216. For example, the user 312 can type in a query or state a problem using the user interface of the secondary device 212, such as a keyboard, a key pad, displayed soft keys, a touch screen, stylus, and/or other such entry methods. Further, any instructions and/or displayed user interface can be presented to the user in a language and/or fonts specified by the user 312 or identified based on language selections associated with the previously registered one or more primary devices 214.

In some instances when a prior problem has been corrected or otherwise addressed, the process 610 may similarly enter step 640 to inquire whether the user has further questions or would like to address other issues or questions. Similarly, the instructions can further provide the user 312 with the ability to exit or terminate the customer support service. For example, the displayed user interface can include an exit or terminate option or button.

In step 642, the remote service provider 216 determines whether an inquiry or entry from the user 312 through the secondary device 212 is recognized. Again, in some instances a user may be able to enter a text string trying to explain the problem, verbally state a problem or otherwise explained. In such instances, the problem or issue may not be readily ascertainable by the remote service provider 216. In those instances where the request can be determined the process 610 returns to step 622 to determine whether the problem can be automatically resolved, the question automatically addressed or other automated response (e.g., through one or more bots).

Alternatively, the process 610 advances to step 644 where a user can be notified to contact and/or be directed to or otherwise connected with a customer service representative. In some instances, the user 312 is notified at the secondary device 212 (e.g., verbally, through displayed text, through a communication messaging display in an interface displayed on the secondary device 212, or other such notification) how to contact a customer service representative (e.g., a phone number, link, or the like), or that the user is being directed to a customer service representative. For example, a communication link may be established between the secondary device 212 and a customer service representative in response to identifying a customer service representative. In some instances, the connection to a customer service representative includes identifying a customer service representative that has knowledge regarding the issue identified by the user, can communicate in a user desired language and/or other such factors.

Additionally, relevant information can automatically be provided to the customer service representative without any further user interaction. As such, the customer service representative has relevant and significant amounts of information about the primary device 214 on behalf of which the user 312 is accessing customer support through the secondary device 212. For example, the specific device type and/or model of the primary device 214 is provided to the customer service representative so that the user does not have to provide this information. A MAC address or other unique identifier can be provided without a user having to acquire this information, which in some instances may be difficult or impossible (e.g., if the primary device 214 is not turning on).

Similarly, device logs, error codes, error files, history information and/or other such information can also be provided to the customer service representative. For example, the customer service representative may be supplied the information and/or provided with a link or location to the information. This allows the customer service representative to more quickly assess the situation and can greatly reduce the time needed to address a user's problem or question about the primary device 214. Additionally, the routing to the customer service representative can again utilize a language selected by a user or on an identification of a user's preferred language based on the language associated with the previously registered one or more primary devices 214 so that the user 312 is directed to a customer service representative that speaks the language desired by the user 312.

As such, the information available can preempt some issues that may affect a user, can more quickly address a user's issue and/or problem with a primary device 214, and can direct a user to a third party service provider 220 for support when the issue or problem is a result of the third party service provider 220.

Further, the support can be obtained through the secondary device 212 and on behalf of the selected primary device 214. Because the user has identified the primary device 214, the user does not need to enter further identification details about the device, such as the serial number of MAC address. Instead, the user merely identifies and/or describes the cause of the problem or issue, and can receive prompt feedback (e.g., via a messaging display on the secondary device 212, from a customer service representative or the like). Further, the customer support service and/or customer support representative can already identify the primary device 214 and have access to information in providing the support (e.g., logs, error logs, error codes, manuals, prior identified corrective action, and the like). This helps the customer support service and customer support representative to more easily debug issues with the primary device 214 and provide prompt corrective answers. Additionally, this ability to rapidly identify problems, more easily address issues and/or direct users to third party service providers 220 can further reduce costs in providing customer service while improving customer service and user satisfaction.

In some embodiments, a ticket identifier (ID), tracking number or other such identifier can be assigned to a request for customer support. This ticket ID can be used by a customer service representative and a user in identifying the request, keeping track of prior interactions relative to the request, attempts to address the request, results of actions taken and/or attempted, issues that may have resulted, and other relevant information. Further, the ticket ID can be used when a user contacts customer service, allowing a customer service representative to quickly retrieve user's prior customer support issues. In some instances a ticket ID may be limited to a specific problem.

Further, in some embodiments, the customer service can be proactive, detect errors prior to receiving inquiries from a user, and in some instances implement corrections without user interaction. For example, the customer service at the remote service provider 216 can receive an error communication from a primary device 214 and identify the error. This identification can cause a notification to be issued to the user through the secondary device 212, primary device 214 or other relevant device (e.g., a message can be issued to a communication messaging display or system of the secondary device 212, an email can be sent to the user, instant messaging can be sent, an automated call or a call from a customer service representative may be initiated from the remote service provider 216, and/or other such action). Further, the customer service at the remote service provide may evaluate the error and identify corrective action. When possible, the customer service may additionally take corrective action without user interaction and in some instances prior to a user submitting a request for customer support. For example, a software update may be issued to the primary device 214 to correct the problem. Alternatively, corrective action is taken in response to the user requesting customer support. Upon receiving the request, however, the customer service would already be aware of the problem based on the prior notification.

In other instances, the customer support provided by the remote service provider 216 may detect issues, problems and/or other factors based on communications received from a primary device 214, such as based on evaluations of logs from the primary device or other such communications. For example, the customer support service may detect that a primary device 214 is not operating in an optimal fashion, a user may not be operating the primary device as recommended and/or other such issues. In response, the remote service provider 216 may notify the user through the secondary device 212 and/or primary device 214, may initiate changes to the primary device 214, or may allow a user to define how the remote service provider 216 is to proceed in response to detection such issues (e.g., option 1—allowing remote service provider 216 to take actions without obtaining express user authorization; option 2—allowing remote service provider 216 to take a limited type of actions without express user authorization; option 3—notify user and request authorization from user; option 4—notify user and request user to contact customer service; and/or other such options).

In those instances where a remote service provider 216 initiates action without user instructions, those actions may be made transparently to the primary device 214 without the user having to be notified. For example, the remote service provider 216 may automatically initiate a defragmenting of memory of the primary device 214 and/or perform other maintenance on the primary device 214 to improve performance With many primary devices 214, users typically do not have an interface to perform such functions (e.g., typically consumer electronic devices, such as IPTVs, Blu-ray Disc Players and other such consumer electronic devices do not provide a user with the ability to perform a disc defragment). As such, in some instances, the remote service provider 216 may detect that it would be beneficial to perform some maintenance and initiates maintenance without further user interaction. For example, the remote service provider 216 may detect that too many applications and/or back ground processes are running, which might interfere with performance, may implement a check for viruses, or perform other maintenance. Similarly, these detections may be made in response to a request for service from the user. In some instances, the user may be notified of the maintenance through the secondary device 212 and/or the primary device 214.

The secondary device 212 can, in some embodiments, further be utilizes to obtain services for some additional devices that are not intended to interact with or take advantage of services provided by the remote service provider 216. For example, some additional devices are not configured to connect with and/or communicate over a distributed network 218 or a local area network 224. As such, these additionally devices typically cannot connect with the remote service provider 216. In some instances, however, the secondary device 212 can be used to access the remote service provider 216 and provide identifying information for one or more of these additional devices that cannot otherwise connect with or communicate with the remote service provider 216. Based on this identifying information the remote service provider may use this information to provide a user with additional information and/or services relevant to these identified additional devices. For example, the remote service provider 216 can provide customer support for an additional device based on user selected options and/or queries relevant to the identified additional device. This customer support is provided without log information or other information from the additional device that might otherwise be beneficial, however, support can still be obtained using the secondary device 212, and the customer support service and/or a customer support representative would have relevant information regarding the additional device in providing the support.

Figure 7:
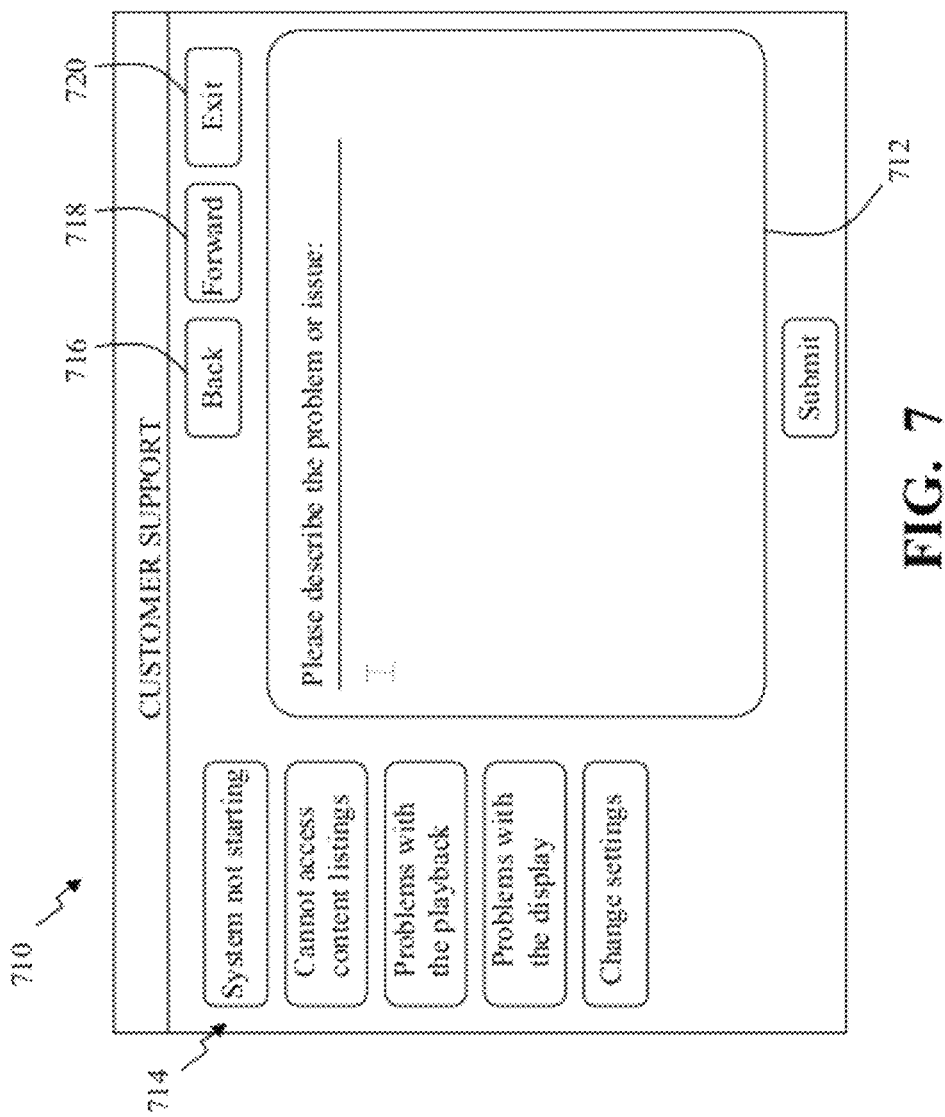
FIG. 7 depicts a simplified block diagram of an example customer support user interface according to some embodiments that a secondary device can display and provide a user with interaction with a remote service provider.

FIG. 7 depicts a simplified block diagram of an example customer support user interface 710 according to some embodiments that can be displayed by a secondary device 212 and provide a user 312 with interaction with the remote service provider 216. The customer support user interface 710 can include a communication messaging display or system 712. This messaging display 712 allows the user 312 to enter text to be submitted to the customer service of the remote service provider 216 and/or a third party service provider 220. In some instances, the messaging display 712 can additionally display messages received from the customer service, such as but not limited to notifications, status information, instructions, requests and other such information. For example, a user utilizing a primary device 214 may have advanced through several levels of a menu structure on the primary device and does not want to leave the menu structure in order to request information and/or support for the location within the menu structure. The user can use the communication messaging display 712 on the secondary device 212 to enter a request and receive information from the customer service without having to leave the menu structure on the primary device 214. In some instances, this can be beneficial to the customer support service and/or representative to be able to know exactly where the user is in the menu structure (e.g., through direct communication with the primary device 214, user's explanation, picture of the screen provided by the secondary device 212, and the like).

Additionally, in some instances the communication message display 712 can display graphic images (e.g., images of a selected primary device 214 and/or buttons or steps to be performed relative to the primary device 214), which can optionally be associated with the playback audio. In some instances, the customer support may instruct, through the communication message display 712, that a user return a digital image (e.g., a digital photograph captured by the secondary device 212) of the current screen view on the primary device 214 to aid in diagnosing the issue or problem.

The customer support user interface 710 can, in some embodiments, further include a listing or set of options 714 of potential problems and/or categories of problems. As described above or below, the listing 714 allows the user to try and identify the potential problem to automate the customer service and/or provide a customer service representative with additional information. In some instances, the customer support user interface 710 can additionally include other controls and/or options, such as but not limited to a "back" option 716, a "forward" option 718 and other such options that are common through web browsers and/or web applications. Similarly, an exit option 720 may be provided to allow the user to exit the user interface and/or the access with the remote service provider 216. In some instances, a scroll bar or the like may be provided when the number of listings 714 exceed the display area, and similarly may be provided relative to the communication messaging display 712. In some embodiments, advertising, special offices and the like can also be displayed in and/or adjacent the customer support user interface 710.

Figure 8:
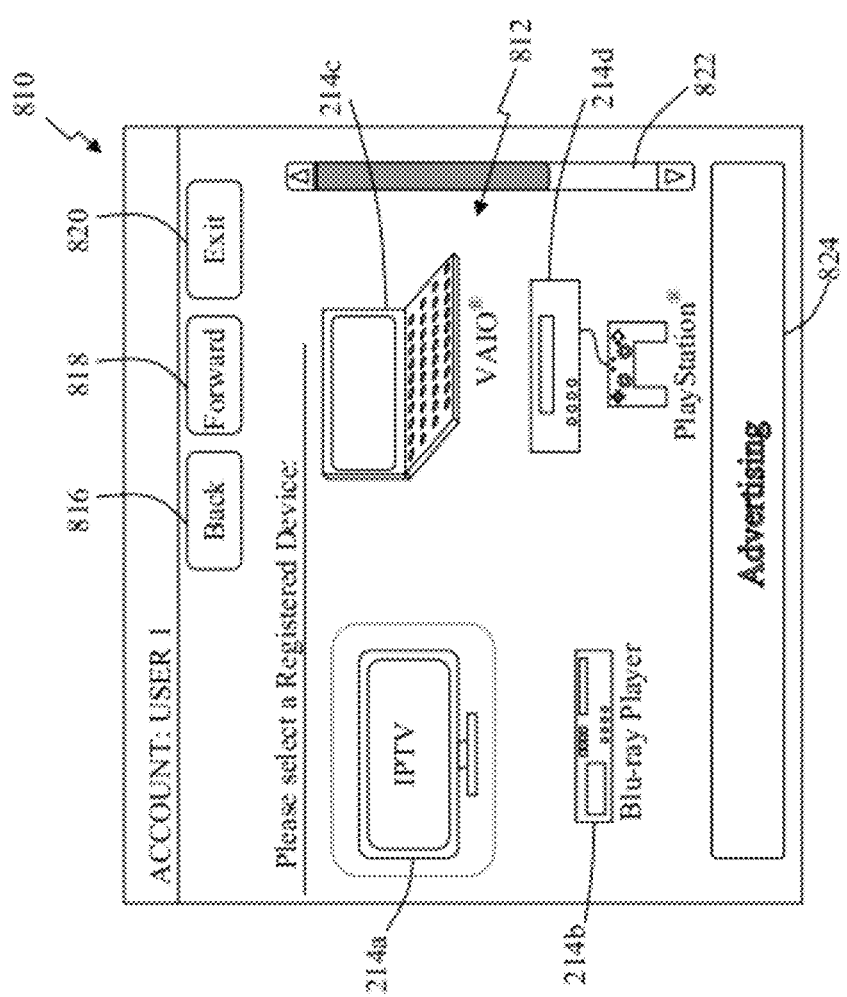
FIG. 8 depicts a simplified block diagram of an example primary device selection user interface according to some embodiments displayed by a secondary device.

FIG. 8 depicts a simplified block diagram of an example primary device selection user interface 810, according to some embodiments, and displayed by a secondary device 212. This primary device selection user interface 810 allows a user 312 to select a primary device 214 on behalf of which the user 312 can utilize the secondary device 212 to access the remote service provider 216. The information can be supplied to the secondary device 212 and displayed through a local program or application. In other instances, a web application is provided to the secondary device 212 that displays the user interface 810. The primary device selection user interface 810 provides icon depictions 812, a listing or other wise identifies the one or more primary devices 214 registered with the accessed account. For example, the user interface 810 may depict or list an IPTV 214a, a digital disc player 214b (e.g., an Internet capable Blu-ray player), a laptop computer 214c, a gaming device 214d (e.g., a Sony PlayStation®), and/or other such devices. Through the user interface of the secondary device 212 the user can select the primary device 214 for which the user 312 is trying to access services. For example, the secondary device 212 may have a touch screen, the user may use arrow keys and an enter or select key to transition between identified primary devices and selection a primary device, a pointing device (e.g., a mouse, track ball, or the like) could be used, a keyboard or buttons could be used, or other such methods of selecting the primary device 214.

In some embodiments, the primary device selection user interface 810 may additionally include other controls and/or options, such as a "back" option 816, a "forward" option 818 and other such options that are common through web browsers and/or web applications. Similarly, an exit option 820 may be provided to allow the user to exit the user interface and/or the access with the remote service provider 216. In some instances, a scroll bar 822 or the like may be provided when the number of registered primary devices 214 extends beyond the visibly displayed options, listings or icons. Further, some embodiments include advertising 824 within and/or adjacent the primary device selection user interface 810 or other user interfaces provided through the secondary device 212. The advertising can be general advertising, or may be at least partially dictated by the user, such as identified based on a user profile at the remote service provider 216 or third party service providers 220, based on the type of primary devices 214 registered, based on the type of secondary device 212, based on prior transactions with the remote service provider 216 and/or third party service providers 220, and/or other relevant information.

Again, the secondary device 212 can access services intended for use by a primary device 214 from multiple different services and third party service providers 220 through the single remote service provider 216. For example, the association of the primary device 214 with multiple sources of content allows for the browsing of content, using the secondary device 212, from multiple sources from a single access point without the user having to individually access each of those separate sources. Similarly, the remote service provider 216 may provide the secondary device 212 with access to content and/or other services that are not generally available (e.g., not generally accessible over the Internet), and instead accessible through the account and/or a provider associated with an account provider. Additionally, in some implementations, when there are some parameters and/or settings associated with the primary device 214 that have some effect on what content is made available to the primary device, the content listing made available to the secondary device 212 is similarly restricted consistent with the parameters and/or settings. For example, the primary device 214 may have a setting to limit the kinds of content that could be played back (e.g., a V-chip setting of a "PG" rating), which would similarly result in limiting the listing of content accessed by the secondary device 212 to those content that meet the settings, and typically substantially equivalent in information as would be accessed through the primary device 214. In some instances, the secondary device 212 is merely an extension of a user interface available through the primary device 214. The use of the secondary device 212 can additionally take advantage of navigation features, like hyper-linked text (which, in some instances, may open a new window), and provide for the management of premium services from a single remote service provider 216 and/or location, which can result in better user experience in content and services (e.g., BIVL services), browsing and the like. Further, utilizing the secondary device 212 the user can take advantage of the features available on the secondary device that may not be available on the primary device 214, difficult to use on the primary device 214 and/or are unique to the second device situation.

There are numerous other benefits of utilizing the secondary device 212 in accessing services generally entitled to be accessed by one or more the primary devices 214. For example, one or more users can access listings of content without interfering with the playback of content on the primary device 214. Similarly, one or more users can simultaneously access listings of content and independently browse through the listing of content. Further, one or more users can access different services on behalf of a single primary device or different primary devices. Content to be played back can be queued without interfering with the playback of content on the primary device 214. Customer support can be obtained through the secondary device 212 even when the primary device 214 is not operating. Features available on a secondary device 212, which are typically more cumbersome and/or not available on the primary device 214, can be used in accessing and utilizing the services. These are just some of the benefits available through the present embodiments.

Figure 9:
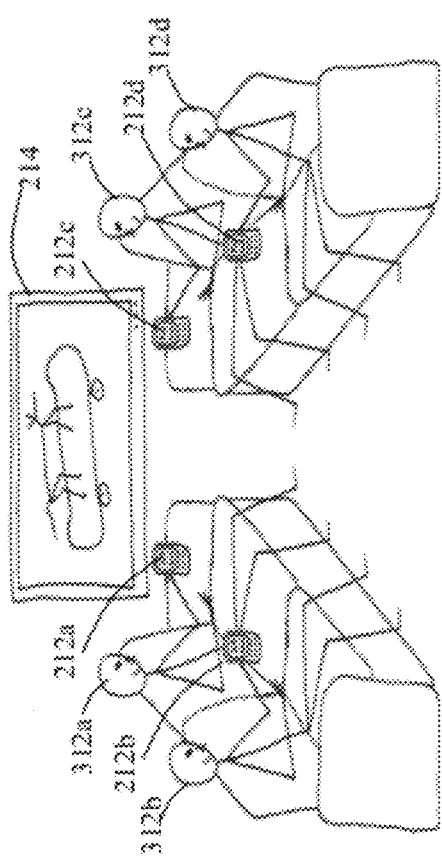
FIG. 9 depicts a simplified block diagram of an example implementation of users utilizing secondary devices to access and take advantage of services intended for use by a primary device and provided through a remote service provider.

FIG. 9 depicts a simplified block diagram of an example implementation of users utilizing secondary devices 212a-212d to access and take advantage of services provided through a remote service provider 216. In this example implementation a plurality of users 312a-312d are watching content being played back on a primary device 214 while the users are searching for and selecting, using secondary devices 212a-212d, additional content to be played back on the primary device 214. The selection of content by one or more of the users 312a-312d can result in a queuing of content at the primary device 214.

Figure 10:
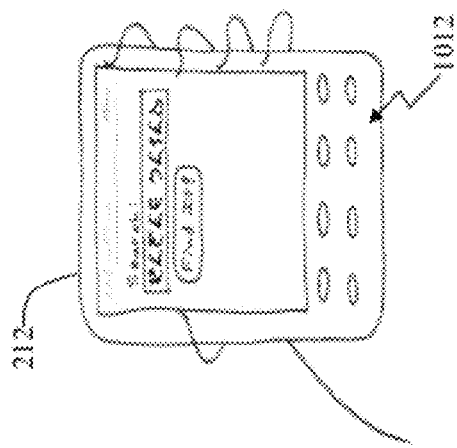
FIG. 10 depicts a simplified block diagram of a secondary device, according to some embodiments, being utilized in accessing services on behalf of a primary device and from a remote service provider.

FIG. 10 depicts a simplified block diagram of a secondary device 212, according to some embodiments, being utilized in accessing services on behalf of a primary device 214 and from a remote service provider 216. Using the interface 1012 of the secondary device 212 a user can easily search for content on a particular subject by quickly and easily typing in one or more search terms, even when those terms contain characters and/or fonts that are not supported by the primary device 214.

Figure 11:
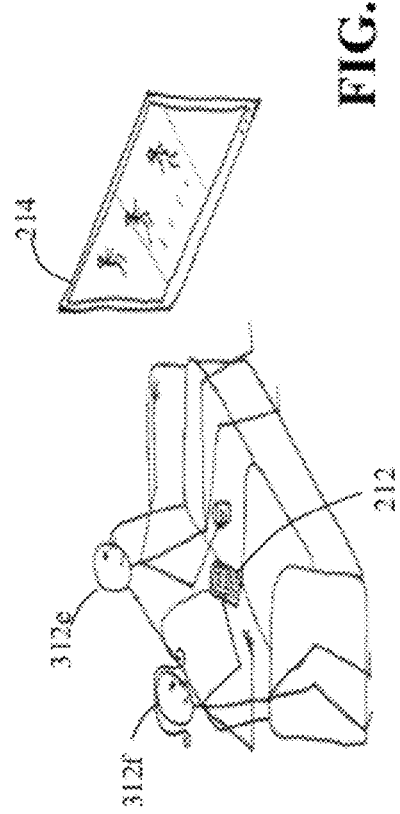
FIG. 11 depicts a simplified block diagram extemporary representation of a user accessing services through a secondary device on behalf of a primary device.

FIG. 11 depicts a simplified block diagram extemporary representation of a user 312f accessing services through a secondary device 212 on behalf of a primary device 214. In this representation, a first user 312e is actively watching content on the primary device 214. The second user 312f is simultaneously accessing a content listing service and searching additional content using the secondary device 212 to be queued and played back when the first content completes playback or is otherwise terminated.

Figure 12:
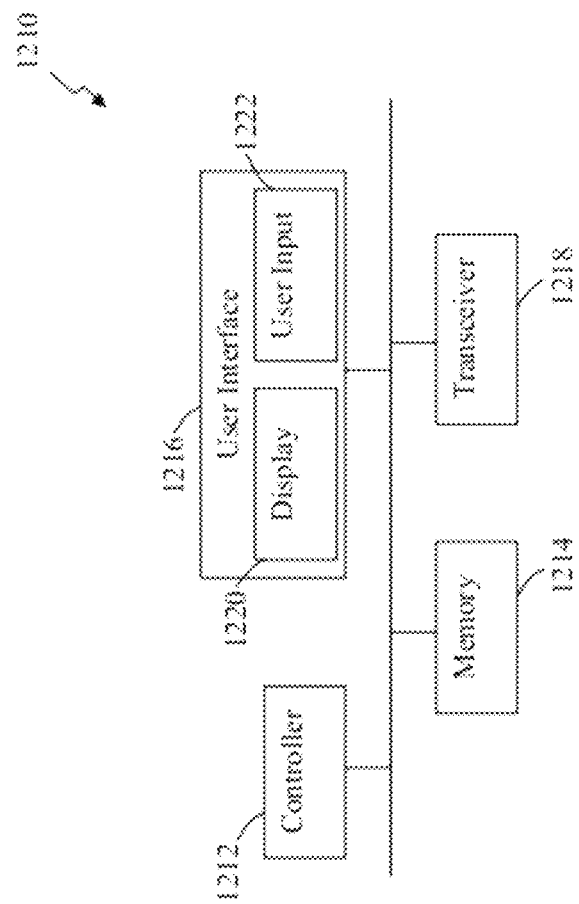
FIG. 12 depicts a simplified block diagram of a system, according to some embodiments, that can implement and/or can run some or all of the methods, processes and/or techniques in accessing, through a secondary device, remote services intended to be used by a primary device.

The methods and techniques described herein may be utilized, implemented and/or run on many different types of systems. Referring to FIG. 12, there is illustrated a system 1210 that may be used for any such implementations. One or more components of the system 1210 may be used for implementing any system or device mentioned above or below, such as for example any of the above or below mentioned secondary device 212, primary device 214, remote service provider 216, main server 412, proxy server 414, third party service provider 220, etc. However, the use of the system 1210 or any portion thereof is certainly not required.

By way of example, the system 1210 may comprise a controller 1212, memory 1214, and a user interface 1216. The controller 1212 can be implemented through one or more processors, microprocessors, logic and/or other control hardware and/or software, and may be used to execute or assist in executing the steps of the methods and techniques described herein, and control various communications, programs, content, listings, services, interfaces, etc. The user interface 1216 can allow a user to interact with the system 1210 and receive information through the system. In some instances, the user interface 1216 includes a display 1220 and/or one or more user inputs 1222, such as a keyboard, mouse, game controller, buttons, touch screen, etc., which can be part of or wired or wirelessly coupled with the system 1210. Typically, the system 1210 further includes one or more communication interfaces, ports, transceivers 1218 and the like allowing the system 1210 to communication over the distributed network 218, the local area network 224, directly with other devices and/or other such communications. The system 1210 comprises an example of a control and/or processor-based system.

The memory 1214, coupled with the controller 1212, typically includes one or more processor readable and/or computer readable media accessed by at least the controller 1212, and can include volatile and/or nonvolatile media, such as RAM, ROM, EEPROM, flash memory and/or other memory technology. Further, the memory 1214 is shown as internal to the system 1210; however, the memory 1214 can further include external memory. The external memory can be substantially any relevant memory such as, but not limited to, one or more of flash memory secure digital (SD) card, universal serial bus (USB) stick or drive, other memory cards, hard drive and other such memory or combinations of such memory. The memory 1214 can store code, software, executables, scripts, data, content, multimedia content, textual content, log or history data, user information and the like. In some embodiments, the memory 1214 stores software that implements the user interfaces and allows the user to interact with the remote service provider 216, primary device 214, third party service providers 220 and/or other devices and/or systems.

In some embodiments, one or more of the embodiments, methods, processes, approaches, and/or techniques described above or below may be implemented in a computer program executable by a processor-based system. By way of example, such a processor based system may comprise the processor based system 1210, or a computer, entertainment system, game console, graphics workstation, cellular phone, smart phone, tablet, etc. Such computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques for allowing a user to access a remote service provider 216 through a secondary device 212. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Therefore, in some embodiments the present invention provides a processor or computer program product comprising a medium for embodying a computer program for input to a processor or computer and a computer program embodied in the medium for causing the processor or computer to perform or execute steps comprising any one or more of the steps involved in any one or more of the embodiments, methods, processes, approaches, and/or techniques described herein. For example, some embodiments provides a computer-readable storage medium storing a computer program for use with a computer simulation, the computer program adapted to cause a processor based system to execute steps comprising: receiving, from over a distributed network, a request from a secondary device to access an account; confirming authorization to access the account; identifying one or more primary devices registered with and corresponding to the account in response to confirming authorization to access to the account, where the one or more primary devices are multimedia playback devices; receiving, from the secondary device, a selection of a first primary device of the one or more primary devices, where the first primary device is separate and distinct from the secondary device; identifying services available to the first primary device and configured to be utilized through the first primary device; and providing access, through the secondary device, to the identified services.

Other embodiments provide a computer-readable storage medium storing a computer program for use with a computer simulation, the computer program adapted to cause a processor based system to execute steps comprising: accessing, from a secondary device, a remote service provider over a distributed network, where the remote service provider is configured to provide services for multiple different primary multimedia playback devices accessing the remote service provider over the distributed network; accessing, through the secondary device, an account managed at the remote service provider; detecting a selection of a first primary device that is registered with the account, where the first primary device is a multimedia playback device and is separate and distinct from the secondary device; communicating, over the distributed network from the secondary device to the remote service provider, an identifier of the first primary device; receiving, at the secondary device from the remote service provider and over the distributed network, a listing of services available that correspond to and are configured to be utilized by the selected first primary device; detecting a selection, at the secondary device, of a first service of the listing of services; communicating, over the distributed network from the secondary device to the remote service provider, a request to initiate the selected first service relative to the first primary device such that the first service is available through the secondary device; and providing access, over the distributed network and through the secondary device, to the selected first service.

The present embodiments provide services for multiple different primary devices 214 accessed through a single remote service provider 216 using a secondary device 212. The single remote service provider 216 can collect and/or pool information to allow a user to take advantage of different services for a single primary device 214, as well as different services for different devices, including services from third party service providers 220. For example, the present embodiments provide methods of enable users to access a content service intended for access by a primary device 214 to browse the multimedia content (e.g., BIVL content) using one or more secondary devices 212, and have selected content played by the separate and distinct primary device 214. One or more users can then continue to browse the content on any number of secondary devices 212 without interrupting the content that is playing on the primary device 214. Further, in some implementations methods are provided that are an architecture design and implementation that allows a user to navigate, browse, and search content on a secondary device 212 (e.g., a secondary consumer electronic device, such as smart phones (e.g., Sony Ericsson smart phone), computer (e.g., VAIO™ PC), laptop (e.g., VAIO™ laptop), Mylo™, notebook computer, net book computers, handheld computers, personal digital assistants, mobile phones, gaming devices (e.g., Sony PlayStation®), tablet computers, handheld gaming devices (e.g., PSP™), or any other relevant device with access to the services, for example through a web browser). Concurrently, while a user is using a primary device 214 (e.g., a main home electronic device), another user can access and utilize services available to the primary device using the secondary device 212 that can send a media selection to one or more primary devices 214 of the user's choice for playback.

Some embodiments serve as visual aids to primary devices (e.g., IPTV), but does not require additional investments by the user because these embodiments take advantage of and make use of one or more secondary device 212 (e.g., a cell phone, laptop, etc.), which most users would already have in their possession. Additionally, some embodiments provide a low cost solution that opens up relatively large business and technical opportunities. These embodiments are beneficial complements to primary devices because of the secondary device's strengths, such as data entry, processing power and user experience in content management.

Further, the present embodiments allow users to be able to use their secondary devices to access services (e.g., browse BIVL content) in their own language, perform data entry, search for content, manage their content (e.g., BIVL content), perform transactions and personalize their content experience without disturbing the primary device 214 and/or playback on the primary device. Users can send from the secondary device 212 content selections for playback on the primary device 214 when they are ready to watch the selected content. Further, playback of proprietary content does not occur on the non-authenticated secondary device 212, which reduces and/or minimizes security risks. In some embodiments, the secondary device 212 utilizes one or more web applications to access the available services. These web applications can be written in substantially any programming language, such as HTML, and can allow them to be loaded by substantially any relevant secondary device 212 with a browser. As such, the advantages of using a secondary device 212 are not limited to a small set of compatible devices.

Again, there are numerous advantages of utilizing the secondary device 212 in accessing services available to the primary device 214. Some of these benefits include, but are not limited to: content browsing in a user's own language without disturbing the primary device; ease of data entry, including data entry in a language that may not be supported by the primary device; on-device service affiliation for premium services (e.g., like Netflix™, Sony Pictures Entertainment™, Sony BMG Music™ and BRAVIA Internet Video Link (BIVL) content service, YouTube™ and other services); switching playback between primary devices and resume playback (e.g., from a recently viewed list); social sharing of content to enhance content proliferation; management of subscription-based services from a single location; content browsing and queue management on the content; one-click customer service without the need of entering personal or device information; quick access by a user and/or customer support to relevant device specifications and manuals; hyperlinked text in BIVL forms directs users to informational sites; content queue across primary devices; advertisement revenue through secondary device 212 usage; and other such benefits.

The ability of a user to take advantage of a secondary device 212 provides a solution that can dramatically improve the user experience with primary devices 214 without adding or only minimally adding to the costs of manufacturing the primary devices and/or providing services relative to the primary devices 214. Some embodiments make data entry easy and allow users to browse content without interfering with the primary device 214. Further, some embodiments provide a global solution that connects various primary devices 214 together in a cohesive manner through its potential of initiating playback across primary devices 214. Some embodiments further provide high levels of customer service to users through customer services (e.g., one-click customer service feature), where users do not even need to provide primary device information that can be difficult to retrieve in the event of a primary device breakdown. Additionally, in some implementations, the use of the secondary device 212 in accessing services available to the primary device is potentially a self-paying feature with advertisement revenue coming from using the second devices, providing potentially a zero-cost or profit generating solution that drastically increases the functionalities available to users and user's experiences.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of providing access to services, the method comprising:
receiving, at a service provider server and from over a distributed network, a request from a secondary device to access an account, wherein the service provider server is remote and distinct from the secondary device;
confirming authorization to access the account;
identifying one or more primary devices registered with and corresponding to the account in response to confirming authorization to access to the account, wherein the one or more primary devices are multimedia playback devices;
receiving, at the service provider server from the secondary device, a selection of a first primary device of the one or more primary devices, wherein the first primary device is separate and distinct from the secondary device and the service provider server;
identifying services available to the first primary device and configured and intended to be utilized through the first primary device;
providing access through the secondary device to the identified services on behalf of the first primary device, wherein the providing the access to the identified services comprises providing the secondary device with access to the identified services without a request communicated to the first primary device;
requesting, through a proxy server and from one or more third party service providers, a listing of content available to be played back on the first primary device; and
communicating to the secondary device an altered listing of available content, wherein source access information that provides direct access to the identified content is removed in the altered listing.

2. The method of claim 1, wherein the providing access to the identified services comprises:
receiving a request, at the service provider server over the distributed network and from the secondary device, to access one or more content sources;
identifying, in accordance with the account, one or more sources of multimedia content and that provide the first primary device with access to multimedia content; and
wherein the communicating the altered listing comprises communicating, over the distributed network from the service provider server to the secondary device, a listing of content, comprising the altered listing, available from the one or more sources of multimedia content and available to be played back on the first primary device, wherein the sources of multimedia content are remote from and separate from both the first primary device and the secondary device.

3. The method of claim 1, wherein the providing access to the identified services comprises:
receiving a request, from the secondary device, for customer support for the first primary device;
identifying the first primary device without receiving further identification information from a user or communicating with the first primary device;
accessing information specific to the first primary device without further user interaction; and
providing corrective information, over the distributed network and to the secondary device, relevant to the first primary device in addressing an issue occurring at the first primary device.

4. The method of claim 1, wherein the providing access to the identified services comprises:
receiving a request, from the secondary device, for customer support for the first primary device;
detecting a problem occurring at the first primary device;
determining that the problem is a problem caused by a service provided by a third party service provider;
forwarding, without further user interaction, error information to the third party service provider, where the error information corresponds to the problem occurring at the primary device; and
establishing a communication link between the secondary device and the third party service provider.

5. The method of claim 1, wherein the providing access to the identified services comprises directing a communication from the secondary device to a proxy server, and requesting, through the proxy server and from one or more third party service providers, listings of content available to be played back on the first primary device.

6. The method of claim 2, wherein the communicating the listing of content available to be played back on the first primary device comprises:
identifying restrictions of content as defined by the first primary device without having to communicate with the first primary device in implementing the step of identifying the sources of multimedia content; and
compiling the listing of content while applying the restrictions such that not all of the content available from the one or more sources is included in the listing of content.

7. The method of claim 3, wherein the providing the information relevant to the first primary device in addressing the issue comprises:
identifying a customer service representative;
establishing a communication link between the user and the customer service representative without additional user interaction; and
providing, without further user interaction, the information specific to the first primary device to the customer service representative;
wherein the customer service representative forwards the corrective information relevant to the first primary device in addressing the issue occurring at the primary device.

8. A method of providing access to services, the method comprising:
receiving, at a service provider server and from over a distributed network, a request from a secondary device to access an account, wherein the service provider server is remote and distinct from the secondary device;
confirming authorization to access the account;
identifying one or more primary devices registered with and corresponding to the account in response to confirming authorization to access to the account, wherein the one or more primary devices are multimedia playback devices;
receiving, at the service provider server from the secondary device, a selection of a first primary device of the one or more primary devices, wherein the first primary device is separate and distinct from the secondary device and the service provider server;
identifying services available to the first primary device and configured and intended to be utilized through the first primary device; and
providing access through the secondary device to the identified services on behalf of the first primary device, wherein the providing the access to the identified services comprises providing the secondary device with access to the identified services without a request communicated to the first primary device;
wherein the providing access to the identified services comprises:
receiving a request, at the service provider server over the distributed network and from the secondary device, to access one or more content sources;
identifying, in accordance with the account, one or more sources of multimedia content and that provide the first primary device with access to multimedia content; and
communicating, over the distributed network from the service provider server to the secondary device, a listing of content available from the one or more sources of multimedia content and available to be played back on the first primary device, wherein the sources of multimedia content are remote from and separate from both the first primary device and the secondary device;
wherein the communicating the listing of content available to be played back on the first primary device comprises:
requesting, through a proxy server and from one or more third party service providers, listings of content available to be played back on the first primary device;
receiving, at the proxy server and in response to the request for the listings of content, the listings of content available to be played back on the first primary device from the one or more third party service providers;
generating, through the proxy server, an altered listing of available content from the listings of content, where the altered listing of available content comprises a different content identifier corresponding each of the available content in the altered listing, and wherein the generating the altered listing comprises removing, at the proxy server, source access information that provides direct access to the identified content; and forwarding the altered listing to the secondary device such that the secondary device cannot directly access content corresponding to those identified content with the removed information.

9. The method of claim 8, further comprising:

receiving, over the distributed network and from the first primary device, a first content identifier as selected through the secondary device and communicated from the secondary device to the primary device;

identifying, using the first content identifier, a first content corresponding to the first content identifier; and communicating, to the first primary device and over the distributed network, source access information that provides the first primary device with direct access to the first content corresponding to the first content identifier.

10. A non-transitory computer-readable storage medium storing a computer program for use with a computer simulation, the computer program adapted to cause a processor based system to execute steps comprising:

receiving, from over a distributed network, a request from a secondary device to access an account;

confirming authorization to access the account;

identifying one or more primary devices registered with and corresponding to the account in response to confirming authorization to access to the account, wherein the one or more primary devices are multimedia playback devices;

receiving, from the secondary device, a selection of a first primary device of the one or more primary devices, wherein the first primary device is separate and distinct from the secondary device;

identifying services available to the first primary device and configured and intended to be utilized through the first primary device;

providing access through the secondary device to the identified services on behalf of the first primary device, wherein the providing the access to the identified services comprises providing the secondary device with access to the identified services without a request communicated to the first primary device;

requesting, through a proxy server and from one or more third party service providers, a listing of content available to be played back on the first primary device; and forwarding to the secondary device an altered listing of available content, wherein source access information that provides direct access to the identified content is removed in the altered listing.

11. The non-transitory computer-readable storage medium of claim 10, wherein the providing access to the identified services comprises:

receiving a request, over the distributed network and from the secondary device, to access one or more content sources;

identifying, in accordance with the account, one or more sources of multimedia content and that provide the first primary device with access to multimedia content; and wherein the communicating the altered listing comprises communicating, over the distributed network and to the secondary device, a listing of content, comprising the altered listing, available from the one or more sources of multimedia content and available to be played back on the first primary device.

12. The non-transitory computer-readable storage medium of claim 11, wherein the providing access to the identified services comprises:

receiving a request, from the secondary device, for customer support for the first primary device;

identifying the first primary device without receiving further identification information from a user or communicating with the first primary device;

accessing information specific to the first primary device without further user interaction; and providing corrective information, over the distributed network and to the secondary device, relevant to the first primary device in addressing an issue occurring at the primary device.

13. A method for use in accessing remote services, the method comprising:

accessing, from a secondary device, a remote service provider over a distributed network, where the remote service provider is configured to provide services configured for and intended for use by multiple different primary multimedia playback devices accessing the remote service provider over the distributed network;

accessing, through the secondary device, an account managed at the remote service provider;

detecting a selection of a first primary device that is registered with the account, where the first primary device is a multimedia playback device and is separate and distinct from the secondary device;

communicating, over the distributed network from the secondary device to the remote service provider, an identifier of the first primary device;

receiving, at the secondary device from the remote service provider and over the distributed network, a listing of services available that correspond to and are configured to be utilized by the selected first primary device;

detecting a selection, at the secondary device, of a first service of the listing of services;

communicating, over the distributed network from the secondary device to the remote service provider and without communicating a request to the first primary device, a request to initiate the selected first service relative to the first primary device such that the first service is available through the secondary device; and providing access, over the distributed network and through the secondary device, to the selected first service on behalf of the first primary device without communicating a request to the first primary device, wherein the providing the access comprises receiving, over the distributed network and from a proxy server accessing a remote third party service provider, an altered listing of available content available from the third party service provider and configured to be played back by the first primary device, wherein source access information that provides direct access to one or more of the identified content is removed in the altered listing.

14. The method of claim 13, wherein the receiving the altered listing of available content comprises receiving the altered listing altered by the proxy server before being communicated over the distributed network such that it does not include the source access information that provides direct access to the one or more of the available content; and wherein the providing access to the selected first service comprises:

detecting a selection, at the secondary device, of a first content of the available content from the listing of available content; and communicating, from the secondary device, a first content identifier of the selected first content to the first primary device.

15. The method of claim 13, wherein the communicating the request to initiate the selected first service comprises:
    detecting a selection, at the secondary device, of a customer support service; and
    communicating, over the distributed network from the secondary device to the remote service provider, a request to initiate customer support for the first primary device.

16. The method of claim 13, wherein the accessing, through the secondary device, the account managed at the remote service provider comprising logging into the account through the secondary device, where the first primary device is registered with and associated with the account.

17. The method of claim 14, wherein the communicating, from the secondary device, the first content identifier of the selected first content to the first primary device comprises communicating the first content identifier over a local area network, where the first primary device and the secondary device are within the local area network.

18. The method of claim 15, wherein the request for the initiation of the customer support service is configured to activate the remote service provider to access information specific to the first primary device for use in providing customer support as a result of the selection of the first primary device, without a user providing identifying information of the first primary device and without the remote service provider communicating, in response to the initiating the customer service, with the first primary device.

19. The method of claim 16, further comprising:
    receiving, over the distributed network and from the remote service provider, a listing of one or more primary devices registered with the remote service provider and that correspond to the account; and
    displaying the listing of the one or more primary devices, where in the listing identifies the first primary device;
    wherein the detecting the selection of the first primary device that is associated with the account comprises detecting the selection, at the secondary device and from the listing of the one or more primary devices, the first primary device.

20. A method for use in accessing remote services, the method comprising:
    accessing, from a secondary device, a remote service provider over a distributed network, where the remote service provider is configured to provide services configured for and intended for use by multiple different primary multimedia playback devices accessing the remote service provider over the distributed network;
    accessing, through the secondary device, an account managed at the remote service provider;
    detecting a selection of a first primary device that is registered with the account, where the first primary device is a multimedia playback device and is separate and distinct from the secondary device;
    communicating, over the distributed network from the secondary device to the remote service provider, an identifier of the first primary device;
    receiving, at the secondary device from the remote service provider and over the distributed network, a listing of services available that correspond to and are configured to be utilized by the selected first primary device;
    detecting a selection, at the secondary device, of a first service of the listing of services;
    communicating, over the distributed network from the secondary device to the remote service provider and without communicating a request to the first primary device, a request to initiate the selected first service relative to the first primary device such that the first service is available through the secondary device;
    providing access, over the distributed network and through the secondary device, to the selected first service on behalf of the first primary device without communicating a request to the first primary device;
    wherein the providing access to the selected first service comprises:
    receiving, over the distributed network and from a proxy server accessing a remote third party service provider, a listing of available content available from the third party service provider and configured to be played back by the first primary device;
    detecting a selection, at the secondary device, of a first content of the available content from the listing of available content;
    communicating, from the secondary device, a first content identifier of the selected first content to the first primary device;
    wherein the listing of available content comprises a different content identifier corresponding each of the available content and where the listing of available content is altered by the proxy server such that it does not include source access information that provides direct access to the identified content; and
    wherein the communicating the first content identifier comprises communication the first content identifier and not communicating the source access information that would provide the first primary device with direct access to the identified content.

\* \* \* \* \*